W. J. CRUMPTON.
ACCOUNTING SYSTEM.
APPLICATION FILED FEB. 11, 1908.
1,186,469.
Patented June 6, 1916.
12 SHEETS—SHEET 1.
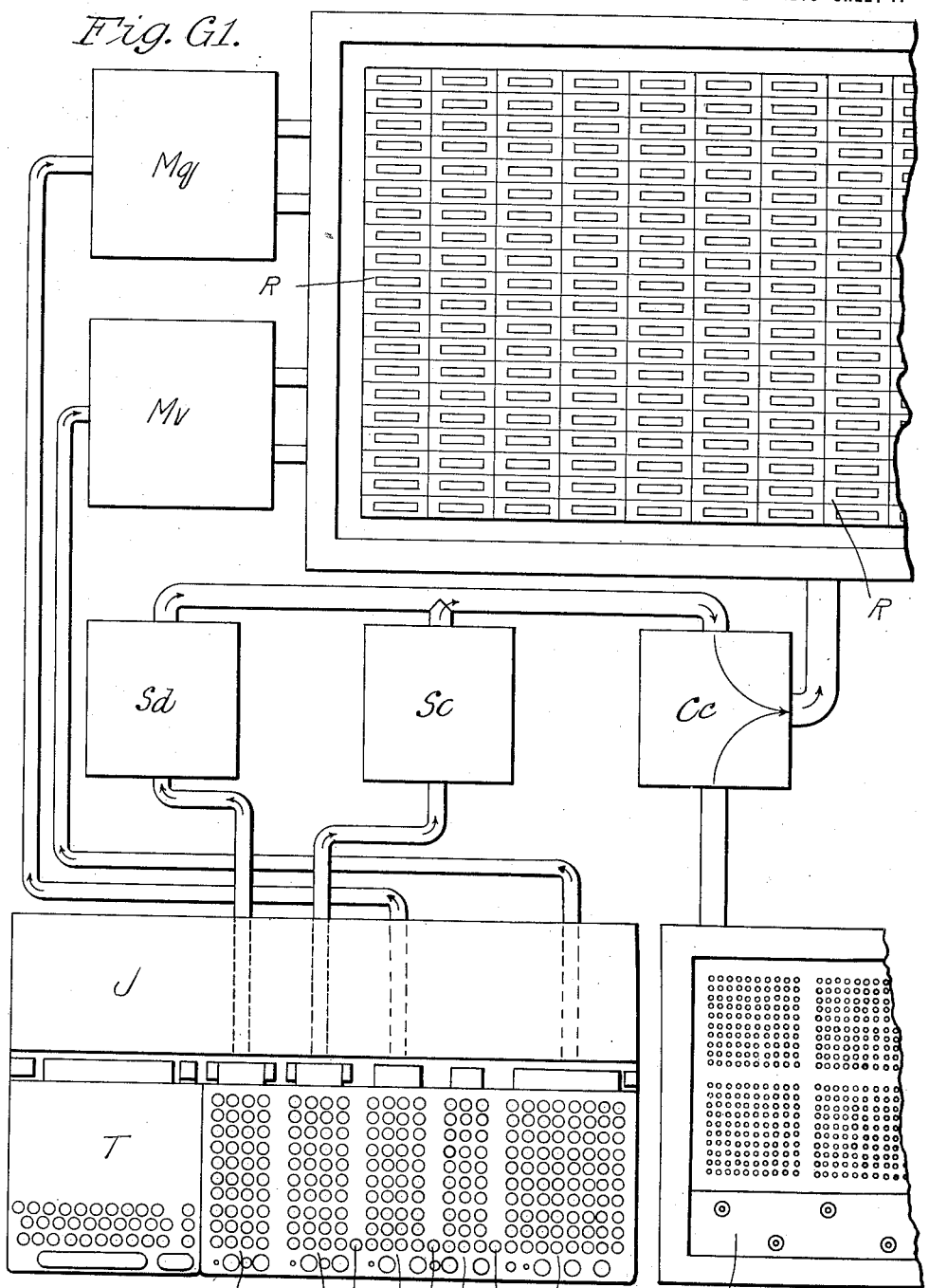

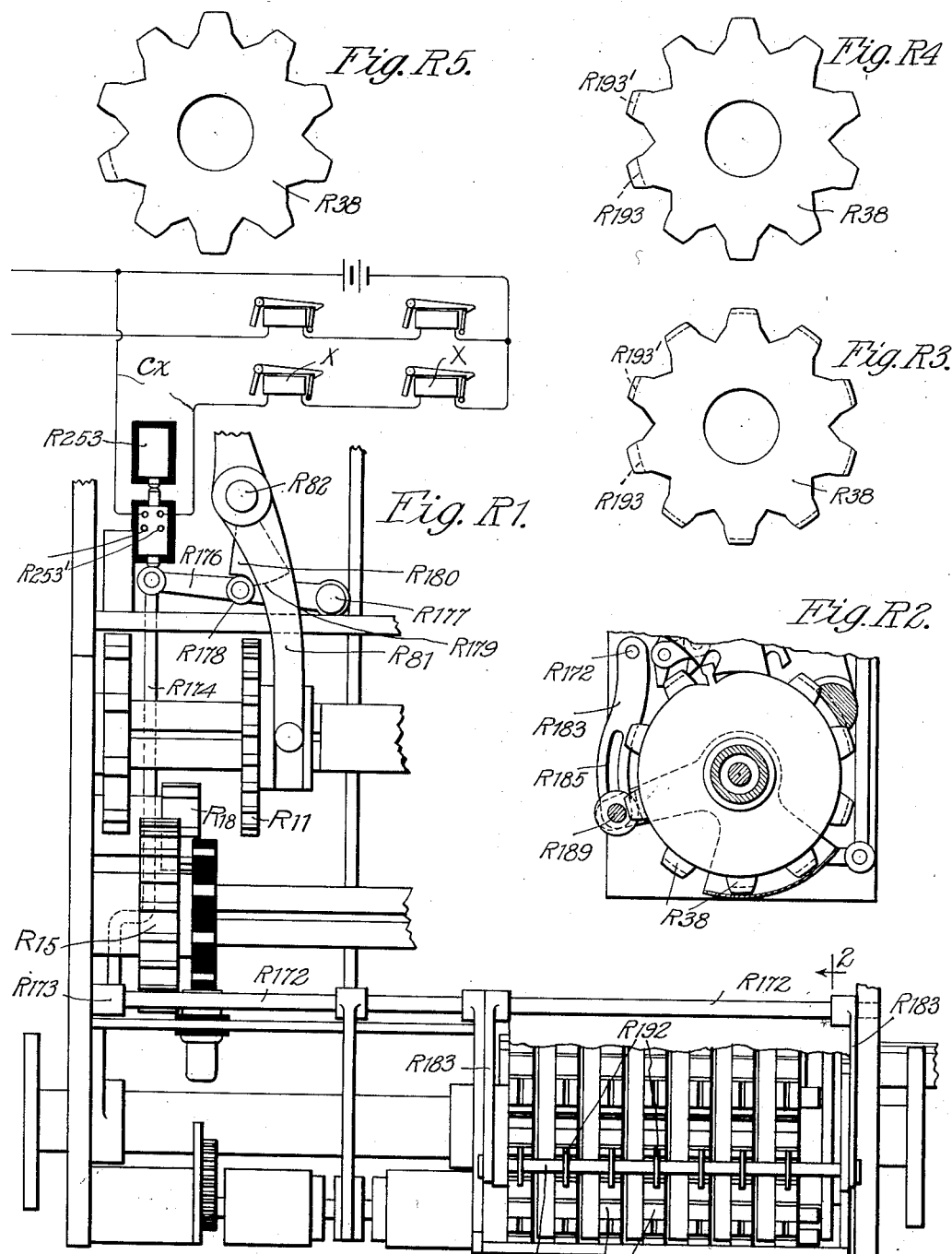

W. J. CRUMPTON.
ACCOUNTING SYSTEM.
APPLICATION FILED FEB. 11, 1908.
1,186,469.
Patented June 6, 1916.
12 SHEETS—SHEET 3.
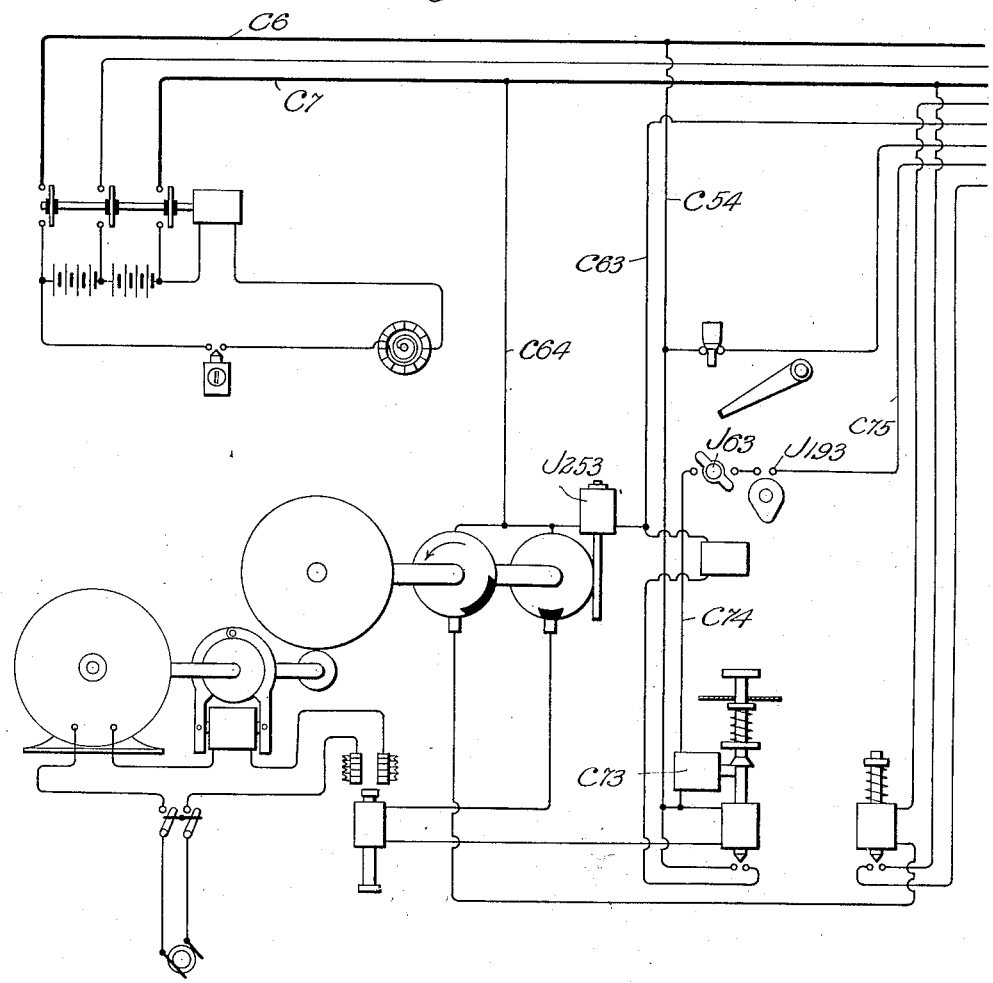
Fig. C1.

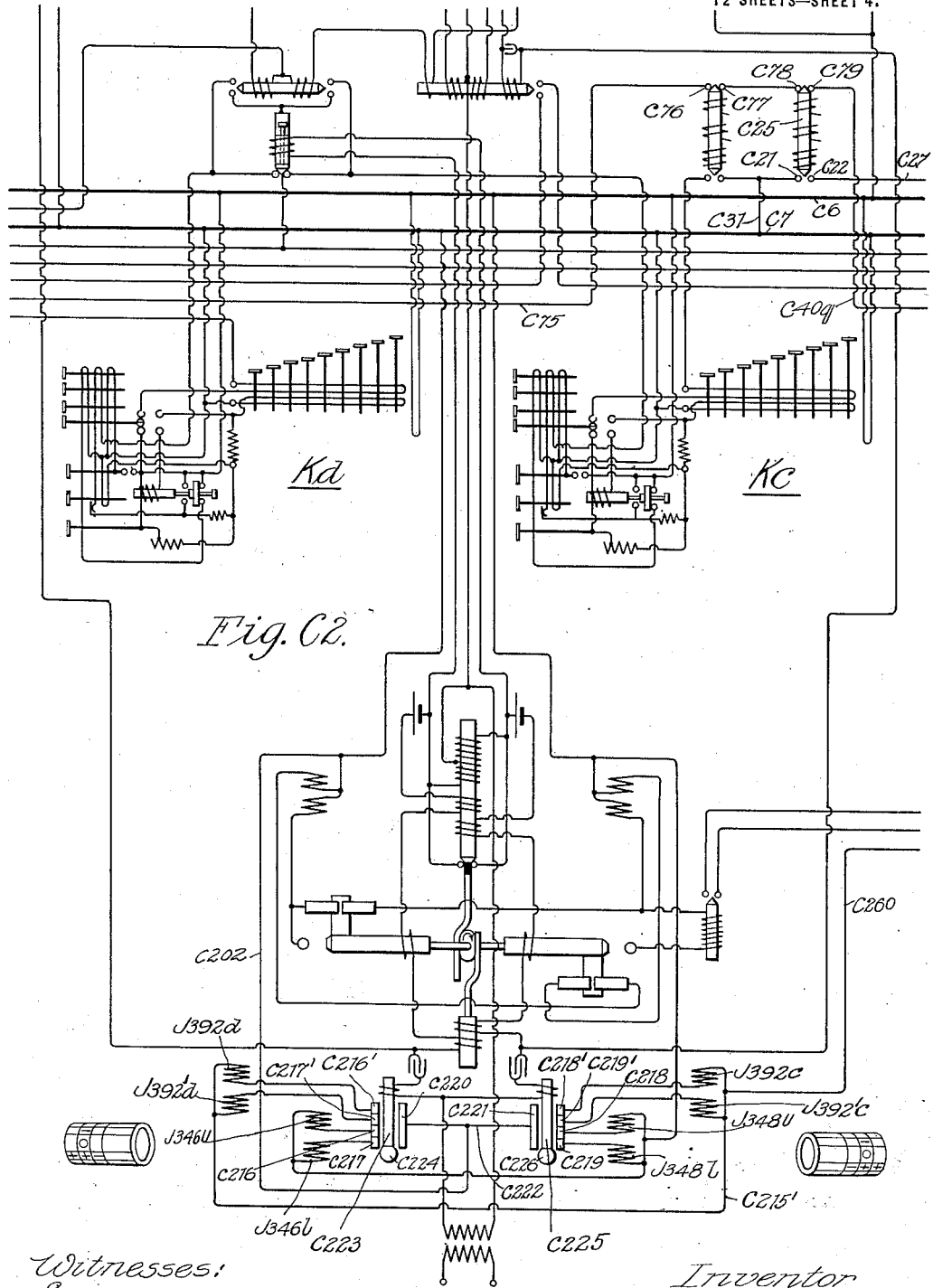

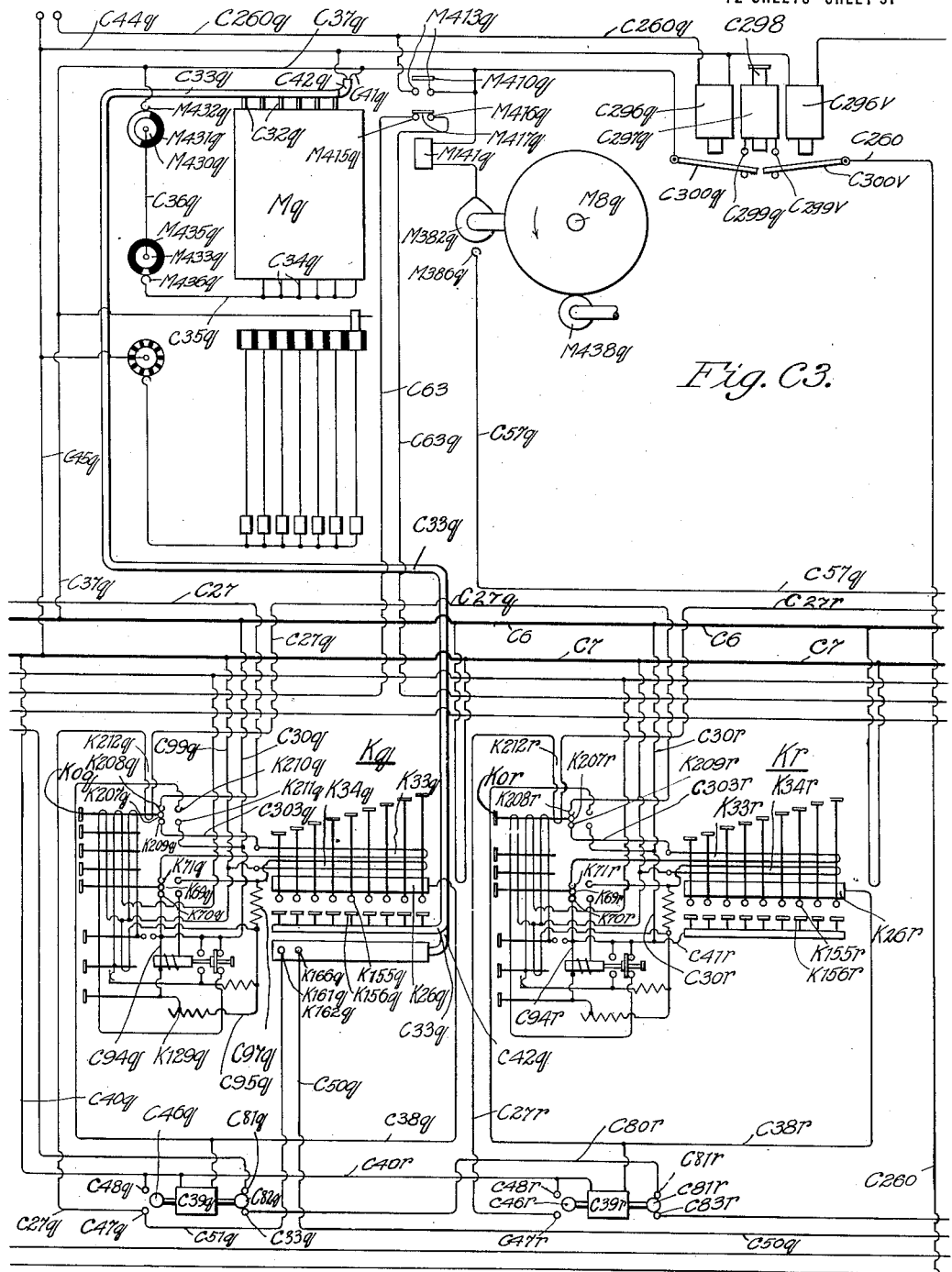

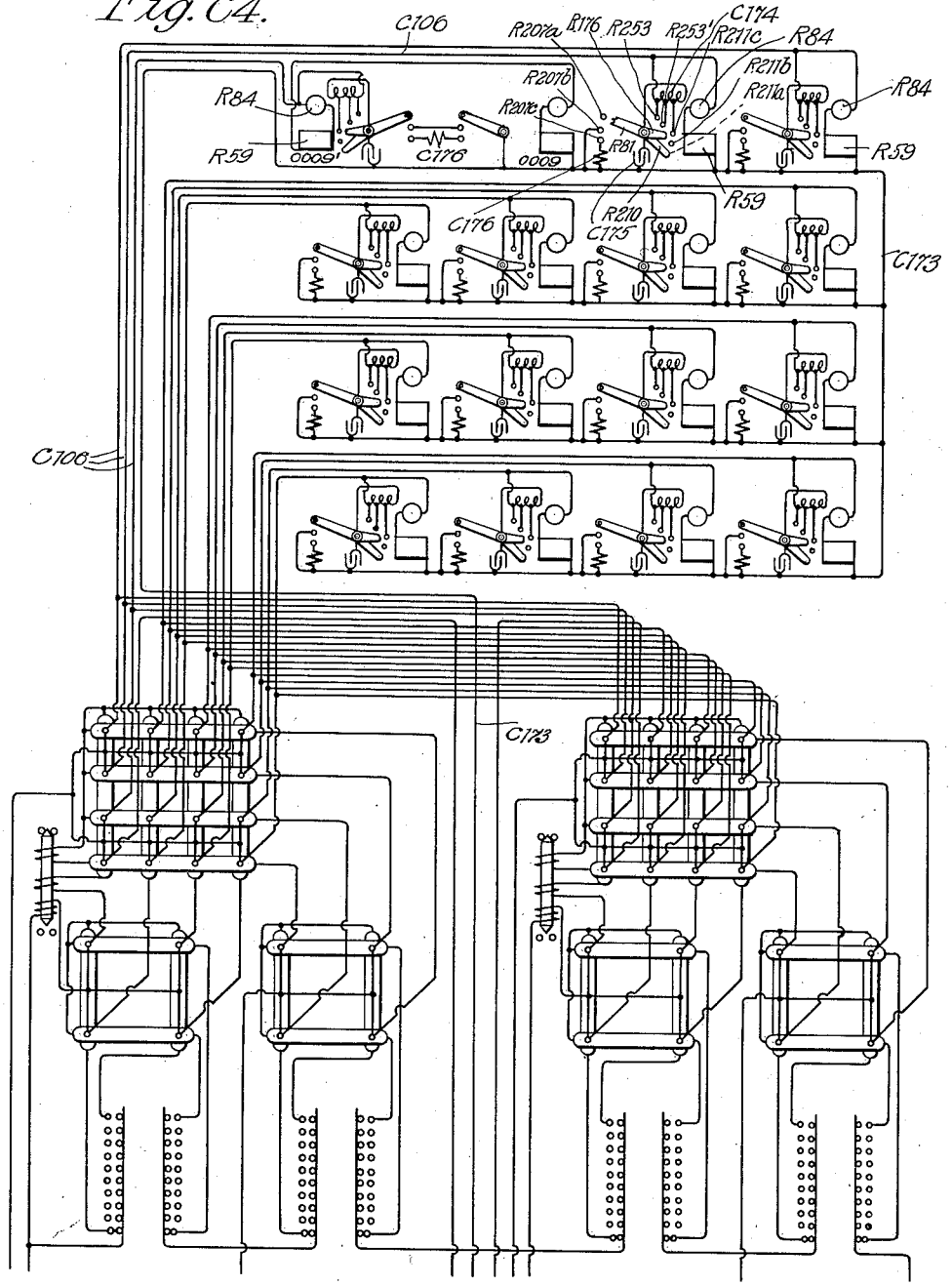

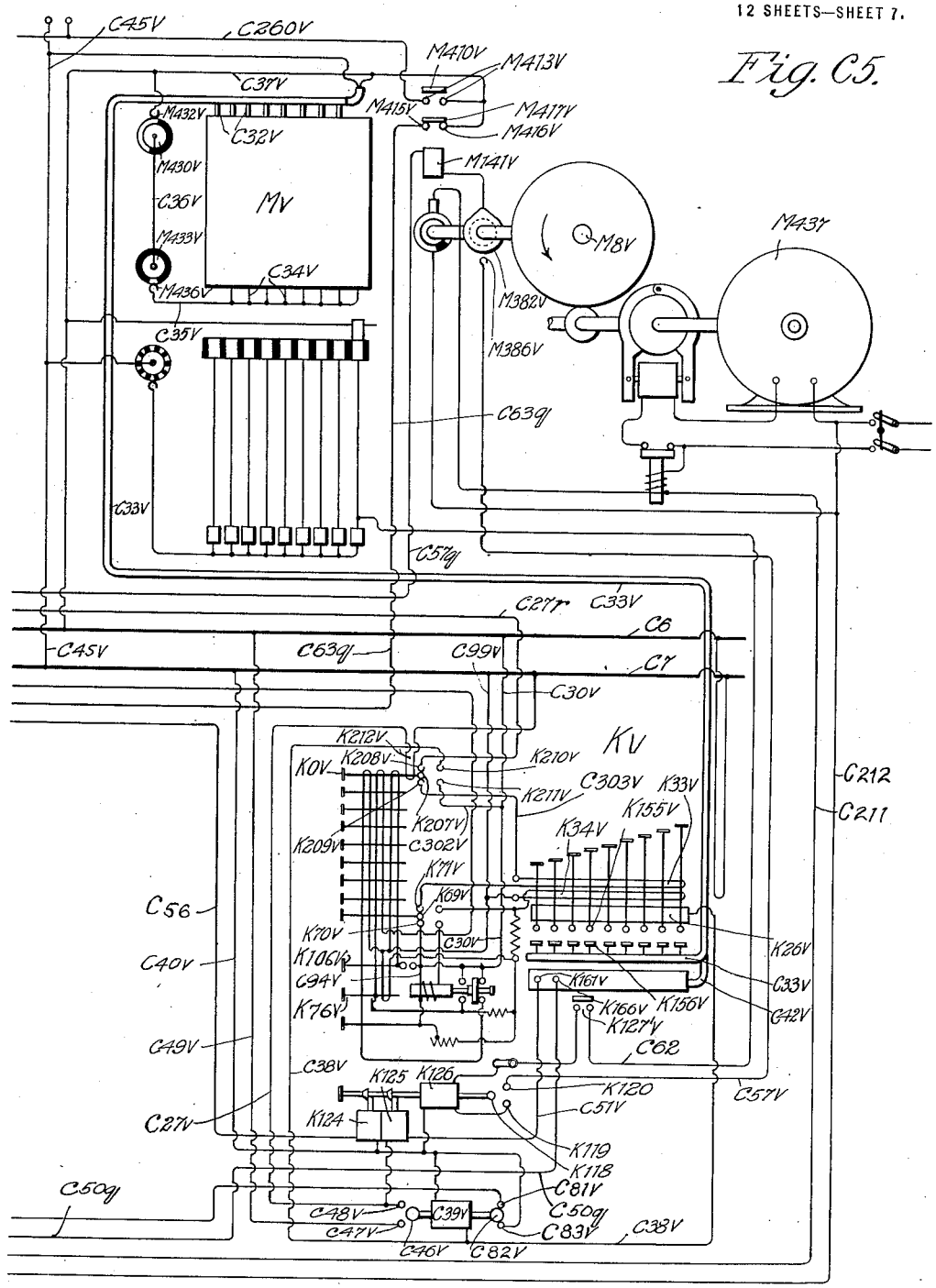

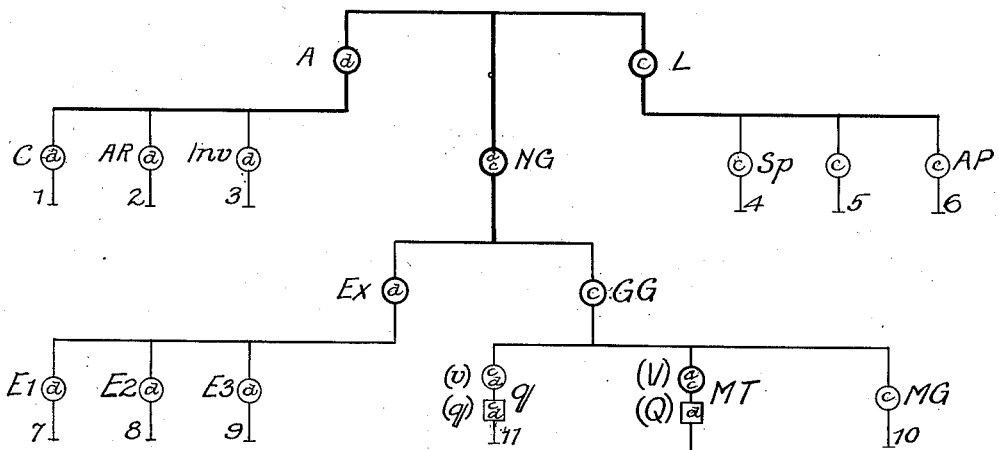
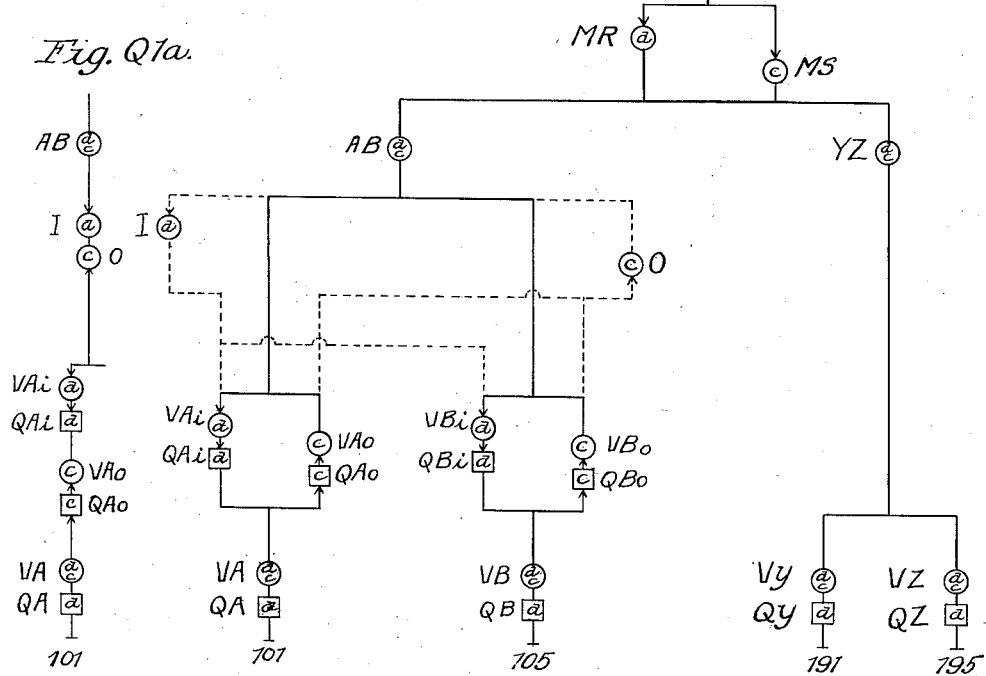

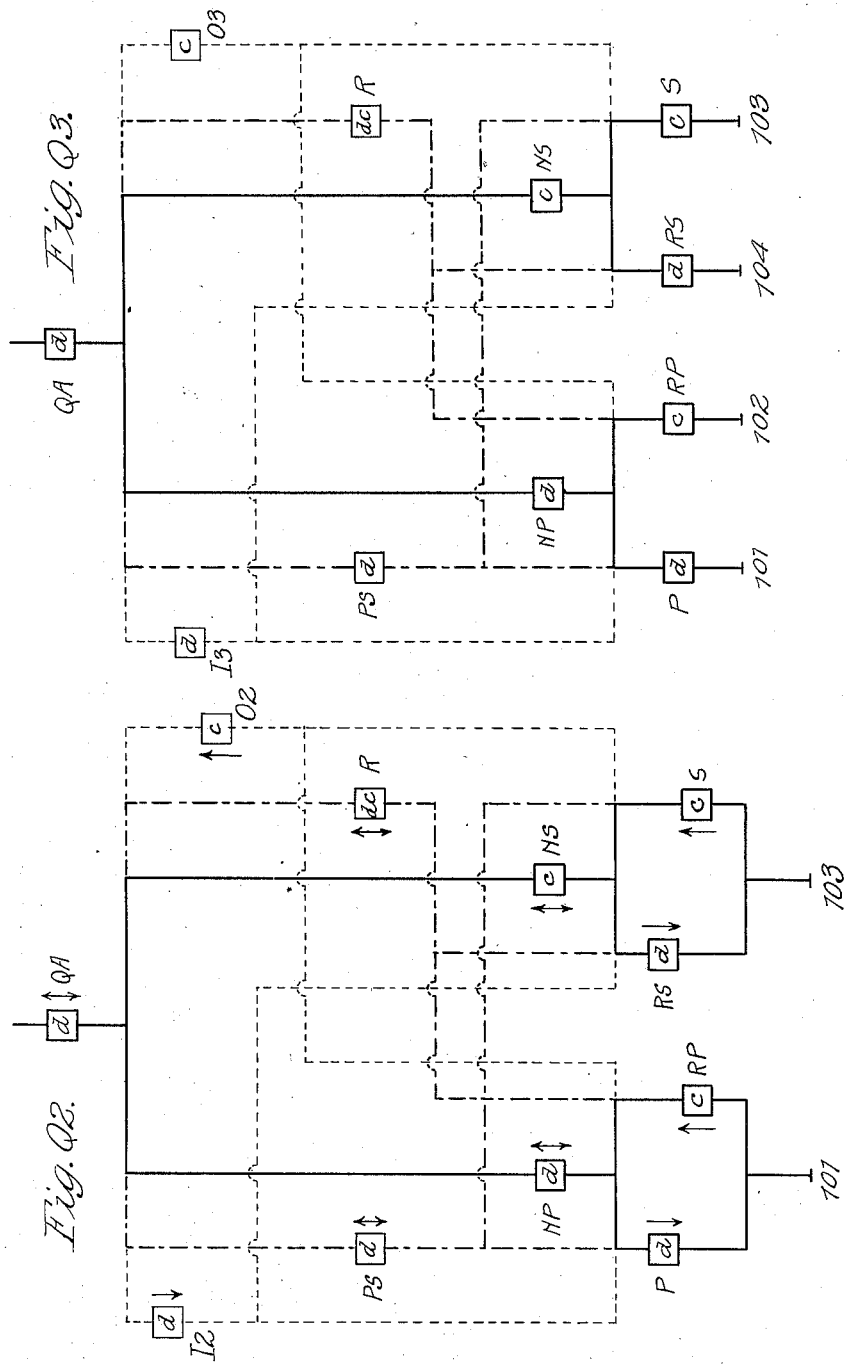

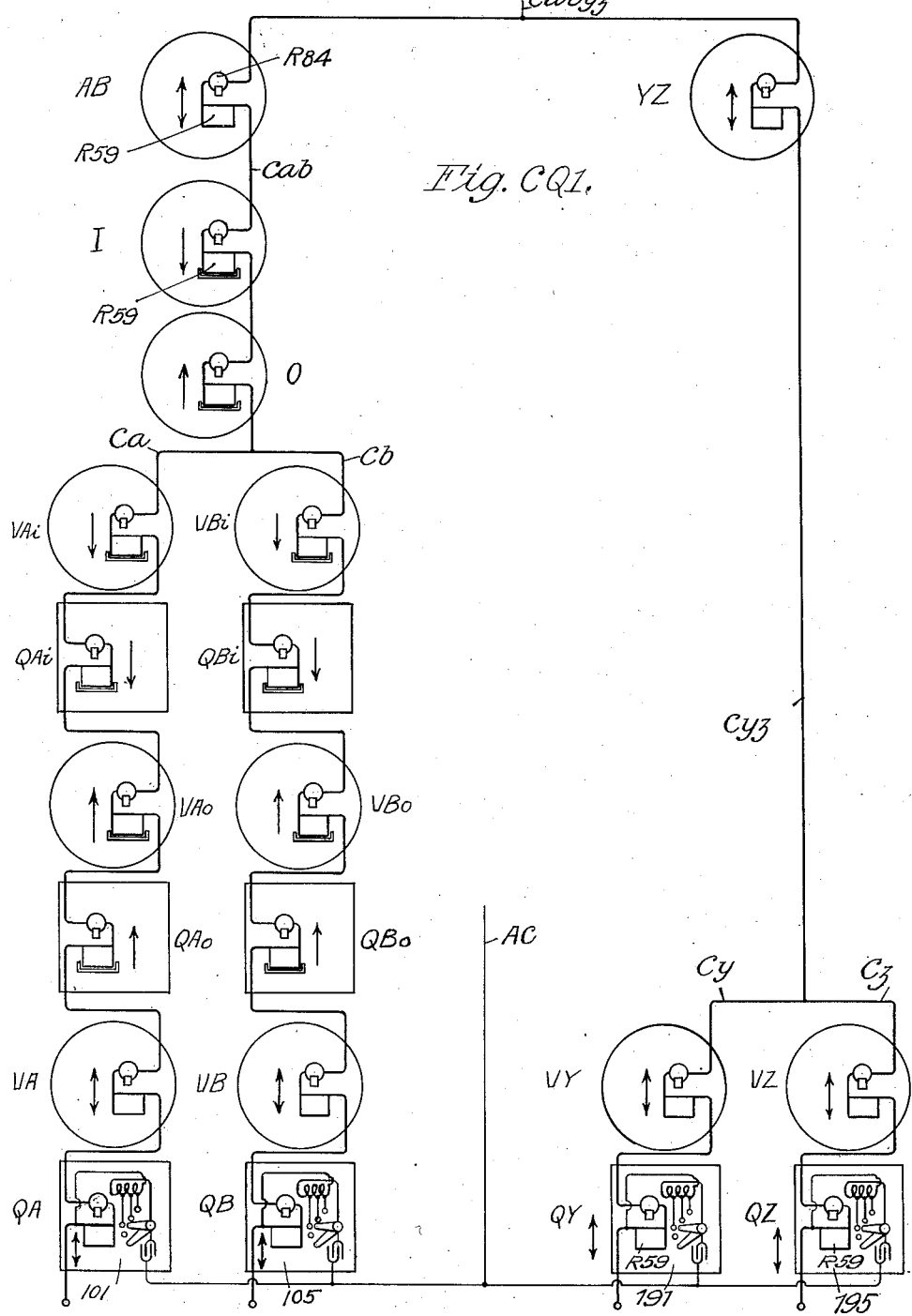

W. J. CRUMPTON.
ACCOUNTING SYSTEM.
APPLICATION FILED FEB. 11, 1908.
1,186,469.
Patented June 6, 1916.
12 SHEETS—SHEET 11.
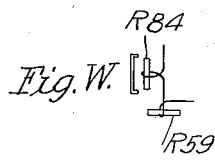
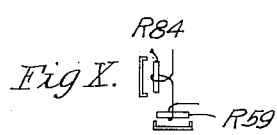
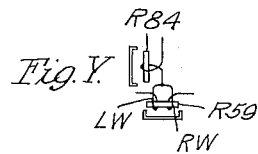
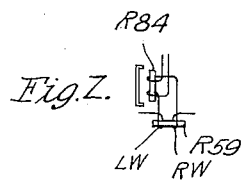
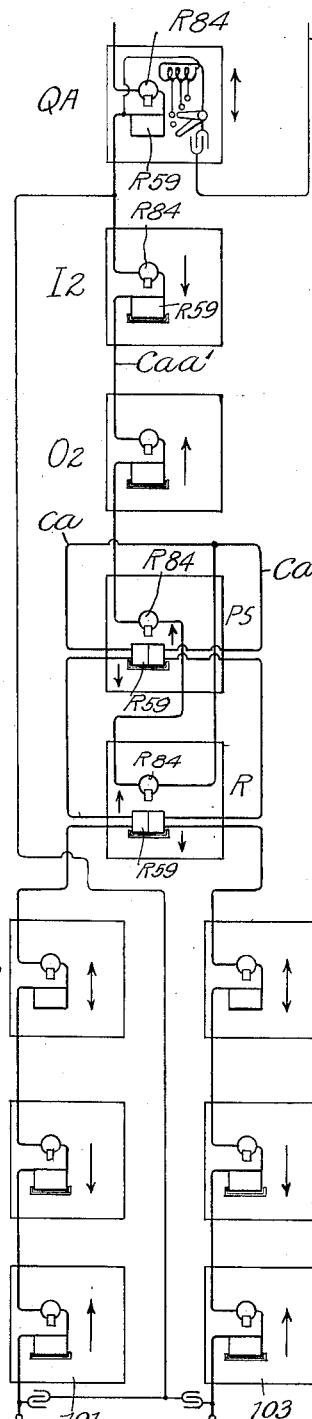
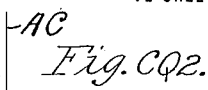
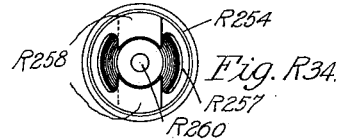
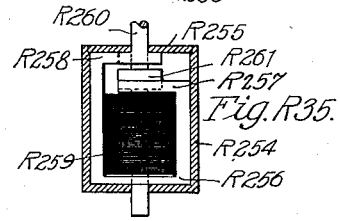
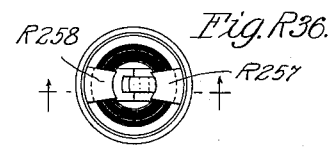
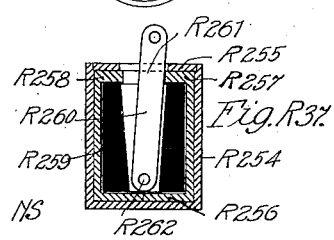
Witnesses:
George C. Higham.
Leonard W. Novander.
Inventor
William J. Crumpton
By Brown & Williams
Attorneys W. J. CRUMPTON.
ACCOUNTING SYSTEM.
APPLICATION FILED FEB. 11, 1908.
1,186,469.
Patented June 6, 1916.
12 SHEETS—SHEET 12.
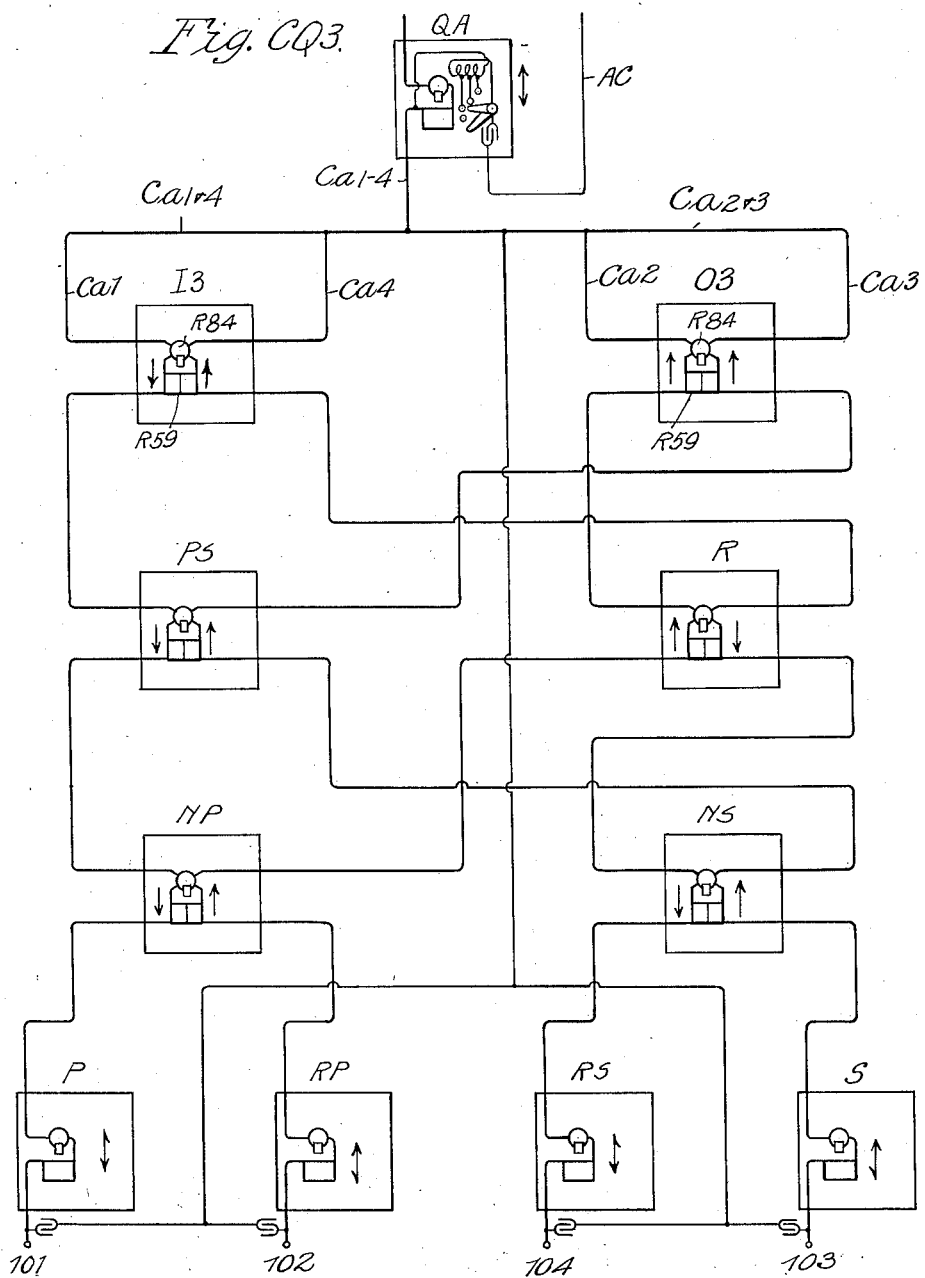
Fig. CQ3.
Witnesses:
George C. Higham
Leonard W. Novander
Inventor
William J. Crumpton
By Brown & Williams
Attorneys

UNITED STATES PATENT OFFICE.

WILLIAM J. CRUMPTON, OF SUPERIOR, WISCONSIN, ASSIGNOR, BY MESNE ASSIGNMENTS, TO WILLIAM R. HEATH, OF BUFFALO, NEW YORK.

ACCOUNTING SYSTEM.

1,186,469.  Specification of Letters Patent.  Patented June 6, 1916.

Application filed February 11, 1908. Serial No. 415,396.

*To all whom it may concern:*

Be it known that I, WILLIAM J. CRUMPTON, a citizen of the United States, residing at Superior, in the county of Douglas and State of Wisconsin, have invented a certain new and useful Improvement in Accounting Systems, (Case 4,) of which the following is a full, clear, concise, and exact description, reference being had to the accompanying drawings, forming a part of this specification.

My present invention relates to methods and systems for stock accounting.

In my co-pending application Serial No. 333,658, filed September 11, 1906, I have disclosed a method and means for securing coöperative registrations in a plurality of registers or other entry receiving devices by common entry-making processes and means. These registrations, though obviously available for either concrete or abstract numbers and therefore for stock accounting or inventory keeping of the simpler kind, wherein only quantities are handled, had special reference to the commercial or financial accounts, commonly involving only dollars and cents.

The present invention is more particularly intended for carrying on that more complete stock accounting which covers both quantities and values. Primarily, it is intended for merchandise transactions only, furnishing a value account for each quantity account with a very slight increase in the labor of keeping the quantity accounts. This is secured by associating a value register with each quantity register and assigning a pair of such registers to each commodity, and in such registers making entries with a physical check against the omission of a value entry for each quantity entry, and vice versa. Either the value entry or the quantity entry may be zero, but in that case it is so indicated. Secondarily, it establishes automatic relations between commercial entries of merchandise transactions and inventory or stock entries of the same transactions, whereby a value entry in a commercial account must be accompanied by an equal and counterbalancing entry in a stock account, and incidentally it affords a common record of the two entries for economy in checking. There is also secured an entirely automatic notice of the approaching depletion of any commodity according to the entries of purchases and sales, such notice being given at any prearranged critical point or points in the fluctuations of the quantity of stock on hand.

This invention provides for the summation or totalization of all of the debit entries and for the separate totalization of all of the credit entries either of value or quantity in any particular account, and also for netting or algebraically summing both debit and credit entries in any such account. Furthermore, this invention provides for that more complex combination of accounts which may properly be called synthesization, as distinct from mere totalization. In accordance with my present invention, I provide for this synthesization of value or quantity accounts on diverse bases: For example, the transactions in sugar may be totalized first upon the basis of kind, e. g. brown, granulated, and pulverized; second upon the basis of locality of sale, e. g. city sales, State sales and foreign sales. All of these results are secured automatically, without requiring any work on the part of the operator beyond the making of the original entries, and in fact the accounting may be carried on so independently of the operator that he may be entirely unaware of the condition of any account, or even the existence of the synthetic or generic account.

In the preferred means for practising this invention, I provide two classes or groups of registers of the adding-subtracting type. These adding-subtracting mechanisms are preferably adapted for algebraic summation on both sides of zero, such as are disclosed, for instance, in my co-pending application, Serial No. 333,658, filed September 11, 1906. One group or class of registers is assigned to entries of quantity, and the other to entries of value only. I provide also a "quantity" master machine controlled by a manually operable keyboard for actuating or controlling the entry in any register which may be connected therewith. In like manner, I provide another actuating or entry controlling mechanism whose operation determines the magnitude of the entry in any connected register of the "value" class or group.

Another and important feature of my invention is a prearranged and generally permanent relationship or association which is established between each quantity register and that register of the value group which is to take account of the value entries of all transactions in the commodity whose entries of quantity are to be made in the associated quantity register. Thus, for example, the register which takes account of the quantity of sugar is permanently connected with another register which takes account of the value of the sugar involved in the various transactions. In like manner, a certain quantity register and a companion value register are permanently assigned to salt, and the registers of this pair are so associated or related with each other from an operative standpoint, that the actuation of a common connecting mechanism will connect the quantity register with the quantity actuating mechanism, and will automatically connect the associated value register with the mechanism for controlling the entries of value. The actuating mechanism for controlling the entries in any connected registers may take the form of a master machine with its controlling keyboard, as disclosed in my co-pending application aforesaid. So, also, the means for connecting the proper registers with the entry controlling mechanism may take the form of the connecting mechanism governed by a keyboard as shown in said co-pending application. By the use of this arrangement, the operator may set up on a register connecting keyboard the number assigned to the sugar account; he may then set up on the quantity keyboard the quantity of sugar involved in the transaction to be entered; he may then set up on the value keyboard the value of the sugar involved in the transaction. On account of the prearranged operative association between the quantity register which is assigned to sugar, and the value register which is assigned to the same commodity, these registers will be operatively connected respectively with the quantity and value entry controlling mechanism. When, therefore, the actuating mechanisms are set in operation, the two registers will be involved with entries corresponding respectively to the "set-ups" on the quantity and the value keyboards. In accordance with the preferred embodiment of my invention, the two actuating or controlling mechanisms are so interlocked with one another that the operator cannot set one of the mechanisms in operation without having made a set-up on the keyboard of the other actuating mechanism. While, therefore, the machine cannot guard against inaccurate set-ups on the keyboards, it does provide against the inadvertent omission of either a quantity or a value set-up for a given transaction.

For the establishment of automatic relations between the purely commercial entries of merchandise transactions, and the stock entries of the same transactions, I provide not only the pairs of associated quantity and value registers as above described, but also a sufficient number of additional value registers to handle the purely commercial accounts. These value registers for handling the commercial accounts are not associated with any particular quantity register. All of the registers, however, both the independent value registers which are assigned to commercial accounts and the pairs of associated registers which are assigned to stock accounts, are arranged for reverse connection with the entry controlling or actuating mechanism, a debit keyboard and a credit keyboard being provided for this purpose. Indeed, the preferred form of my invention is so arranged that no value register can be connected and involved with an entry unless some other value register is reversely connected and counterbalancingly involved with an entry by the actuating mechanism. The register which is assigned to the merchandise account in the scheme of commercial accounting cannot be connected with the actuating mechanism except by and through the connection of some other register assigned to a specific stock account. In order to involve the register assigned to a commercial account with the value of any merchandise transaction, it is therefore necessary to involve the value register assigned to some specific stock account with a counterbalancing entry. Furthermore, as already explained, it is impossible for the operator to make these entries of value without connecting in a quantity register to receive the associated entry of quantity.

When there is combined with the keyboards for controlling the selection and connection of the registers with the actuating mechanisms, and with the keyboards which form a part of the actuating mechanism, a record making apparatus such as the writing machine shown in my co-pending application aforesaid, my present invention affords means not only for tying together the stock accounts and the commercial accounts, but also for making a common record of the entry of transactions involving both. Consequently, one verification of this common record verifies the accuracy of the entries in the commercial accounts and also those in the stock accounts.

The register which is intended to show the total of the debit entries and the register which is intended to show the total of the credit entries of either quantity or value in any account, may be essentially like the registers shown in my co-pending application Serial No. 333,658, filed September 11, 1906, except that in accordance with my present invention such a one-way register is provided with means for establishing an effective, operative connection between the register and the actuating mechanism only when the connecting mechanism is operated debitingly or creditingly, as the case may be. Thus, for example, if it is desired to secure a showing of the total quantity of any commodity which has been received, and also a showing of the total quantity of that commodity which has been sent out, I provide two one-way registers whose connection with the actuating mechanism is controlled by the connecting mechanism previously referred to. These one-way registers, if controlled by electromagnetic apparatus and circuits, may have their connecting in magnets oppositely polarized, so that one of the one-way registers will be connected with the actuating mechanism whenever a debit entry is to be made, and the other one-way register will be connected with the actuating mechanism whenever a credit entry is to be made in that particular account. If, therefore, it is desired to show at all times the net or algebraic sum of all of the entries of value, and also the net or algebraic sum of all of the entries of quantity, and also the total of quantity in-coming, and also the total of quantity out-going, it is only necessary to prearrange an operative association of a two-way, or preferably algebraic, value register, a two-way quantity register and two reversed one-way quantity registers, so that a single set-up upon the selecting and connecting keyboard will effect the operative connection of these registers with the actuating mechanism, it being understood in this connection that only one or the other of the one-way registers will be connected with the actuating mechanism, depending upon whether that particular entry is to be made debitingly or creditingly.

In order to give notice automatically of the approaching depletion of any commodity, the net quantity register is provided with means for causing the display of a signal at any appropriate place, as for example, on the record or journal sheet, as shown in the co-pending application aforesaid, the display of the signal being governed by the position or condition of the register mechanism. An appropriate signal may be displayed not only in one place, but if desired, in a number of places, as for example in the ware room and also at the buyer's desk.

These and various other features of my invention will be better understood in connection with the more detailed disclosure of my invention which follows. In describing this embodiment of my invention, reference may be had to the accompanying drawings, in which—

Figure G1 is an empirical layout of the system, diagrammatically showing the various mechanisms and their relative arrangement; Fig. R1 shows part of a register mechanism; Fig. R2 is a sectional view taken on line 2—2 of Fig. R1; Fig. R3 is a side elevation view of one of the numeral wheels; Fig. R4 is a side elevation of a second numeral wheel; Fig. R5 is a side elevation of a third numeral wheel; Fig. C1, C2, C3, C4 and C5, when fitted together, show the system circuit connections between the various parts which are more or less diagrammatically illustrated; Figs. Q1, Q1a, Q2 and Q3 are diagrams showing in various modified forms the accounting relations between the stock accounts, the trading and the balance sheet accounts; Figs. CQ1, CQ2 and CQ3 are diagrams of the electric circuits arranged to control the various registers in accordance with the requirements imposed by the arrangements shown in Figs. Q2 and Q3; and Figs. W, X, Y and Z are diagrammatic detail views showing a modification of the electro-magnetic windings of the registers shown opposite in Fig. CQ2. Figs. R34, R35, R36 and R37 are details of two forms of polarized magnets.

In Fig. G1, R represents the registers which are mounted upon the panelboard in two groups, these registers being of two classes or sets, the registers of each class being suitably positioned or arranged on the panelboard. M$q$ represents the master machine for controlling the operation of the registers selected for representing stock records or accounts. M$y$ represents the master machine for controlling the operation of the registers selected for representing stock records or accounts. M$y$ represents the master machine controlling the operation of the register selected for representing financial or value transactions. T represents the typewriting machine. J represents the journalizing mechanism which in association with the keyboards produces a consecutive record of all entries. K$d$ and K$c$ are the debit and credit keyboards which select for operation registers to be operated in a positive or a negative direction, respectively. K$q$ represents the quantity keyboard for controlling the operation of the master machine M$q$. K$v$ represents the amount keyboard for controlling the operation of the master machine M$v$. K$r$ represents the rate keyboard for printing the rate or price per unit of commodity upon the journal and memorandum. This rate board is not connected in the operating system circuits and is connected only in the checking and restoring or erasing circuits, being simply a writing keyboard. S$d$ and S$c$ are the automatic switching devices or contact mechanisms connected with the keyboards K$d$ and K$c$, respectively. C$m$ is a plug board for connecting up various additional registers which may be desired for special summations, and C$c$ is a cross-connecting board intervening between the registers and the connecting devices S$d$, S$c$ and C$m$ for arranging various electrical connections between these boards and the registers. The layout in this system is substantially like that in the co-pending application referred to and the patent to C. H. Tallmadge, No. 1,084,667, issued January 20, 1914, except that an additional master machine and the additional keyboards Kq and Kr are provided.

The register mechanisms in the main part are exactly like the register mechanisms in the co-pending application and the patent referred to, slight changes being made in the indicating mechanism so that in addition to controlling signals for indicating when the register comes to zero, signals may also be controlled for indicating when the register indication is greater or less than a predetermined indication. The changes are such that the register will not only control indicating mechanism for indicating when the register comes to zero, but will also control other indicating mechanism for indicating when a certain indication is reached or passed, for instance, where the register is assigned to stock accounting and it is desired that the register indicate when the quantity of stock on hand reaches or falls below a certain amount. In Figs. R1 to R5 these changes are shown, and in Fig. R1 only so much of the register mechanism is shown as will clearly illustrate these changes. R81 represents the clutch lever which is mounted on shaft R82, and adapted to rotate with this shaft is the cam R180. The lever R176 pivoted at R177 carries the cam roller R178 which coöperates with the cam R180. The other end of this lever connects with the rod R174, which connects with the end of arm R173 which is secured at its other end to the shaft R172, which shaft carries the arms R183, R184. Arm R184 has a slot R185 and the arm R183 has a similar slot through which slots passes the rod R189 on which are mounted the washers R192, one over each of the order wheels R38. As has been described in the co-pending applications, when the clutch lever R81 is in its normal position, as shown in Fig. R1, the cam R180 and the cam roller R178 are in such relative position that the lever R176 is in its rear position, thus allowing the arms R183 and R184 to drop and the rod R189 with the washers thereon to fall toward the order wheels. When the clutch lever is moved to connect the driving gears, the cam engages the roller and moves forward the lever R176, whereupon arms R183 and R184 are swung upwardly to carry the rod with the washers away from the numeral wheels. In the prior application referred to, the numeral wheels at their zero indications are provided with slots, so that when the register comes to rest at zero indication the washers will drop into the slots and allow rotation of the arms R183 and R184, thereby to allow lever R176 to move to its rear position. During any other position of the register wheels their washers will not have a slot in which to enter, and, therefore even though the lever R176 is released from the cam R180 it cannot move entirely back. Therefore, unless the register comes to rest at a zero indication the end of the lever R176 cannot engage with contact mechanism R253' to control a signal circuit which will indicate this zero position. In accordance with the present invention, besides making provision for indicating when the register mechanism comes to zero, means is provided for indicating when the register comes to rest at some other predetermined position, for example, where a register mechanism represents a stock account and it is desired to indicate when the quantity of stock reaches or falls below a certain predetermined amount. Suppose it is desired that a register indicate when its reading is below 200. Fig. R3 shows the construction of the units and tens order wheels. The zero tooth already has the slot R193 and each of the other teeth is provided with a shallower slot R193'. Fig. R4 shows the construction of the hundreds wheel, in which the 1 tooth only has a shallow slot R193', the zero teeth having the deeper slot R193. Fig. R5 shows the construction of the higher order wheels, all having a deep slot in the zero tooth. Should the register come to rest at 199 or less, the deeper slots R193 of all numeral wheels above the hundreds order come to rest under their associated washers R192. The hundreds numeral wheel comes to rest with either the slot R193' or R193 under its associated washer, depending upon whether this order wheel comes to rest at zero or at one. The tens and units order wheels having their teeth slotted all the way around, would present either a zero slot or a shallower slot, depending upon whether their indication is zero or some other number. Therefore, whatever the indication of the register, provided it is 199 or less, all washers R192 may drop to the first position limited by the shallower depth slots, and the corresponding rotation of arms R183 and R184 and shaft R172 causes the rearward movement of rod R174 and lever R176 to cause this lever to affect the contacts R253' to close a suitable circuit, including the indicating devices.

In Fig. R1 is diagrammatically shown an appended local circuit Cx controlled by contacts R253' and including the low value signals X which may be in any location, as, for instance, at the warehouse or in the purchasing agent's office. If the register, however, comes to rest at zero, then the washers may all drop into the deeper slots allowing maximum rotation of shaft R172 and greatest rearward movement of lever R176 actuating contact mechanism R253, which controls the circuit of the zero indicating mechanism. This contact mechanism can, of course, be actuated only after a calculation, when the clutch lever R81 has been restored and the cam crest R179 withdrawn from the roller R178 on the lever R176. During an operation of calculation, when the clutch mechanism is effective, the lever R176 is moved forward by the cam mechanism and the washers held away from the numeral wheels. The arrangement of slots will differ for each desired low value amount. Thus, if the hundred numeral wheel had a slot R193' cut in the 2 tooth, the low value indication would commence at 299 instead of at 199. The provision of the shallower slots and the addition of the contact mechanism R253' are the only structural differences in this register mechanism over that described in full detail in the co-pending application referred to. This additional contact mechanism R253' involves also slight changes in the circuit arrangements, and in Fig. C4 the new circuit arrangements are shown. Instead of having two impedances C174 and C174', as in the prior circuit arrangement, the single impedance C174 is provided and connected at intervals with the contacts R253, R253' and R211c. Contacts R253 and R253' are adapted for control by the arm or lever R176, diagrammatically represented here. The arm R210 normally connects with contact R211a and is adapted for engagement with contacts R211b and R211c. Arm R81 represents the clutch lever for engaging contacts R207a, R207b and R207c, these contacts controlling circuits containing indicating apparatus for indicating the direction of operation of the connected in register. The arms R176, R210 and R81 are all connected together and with one terminal of the impedance C174, whose other terminal connects with the individual register conductor C106. Each set of levers also connects through condenser C175 with common conductor C173. This impedance controls the current flow through the alternating current signaling system, and thereby the operation of contact members C223 and C225 shown at the bottom of Fig. C2. In the system circuits of the co-pending applications, three contact segments are shown for engagement with the contact heads C224 or C226 of the contact members C223 and C225, these contact heads coöperating to control circuits in which are electrical indicating mechanism for indicating whether a particular register comes to rest above, below or at zero. For instance, contact segments C217, C216 and C216' are shown in the prior system adapted for connection with the contact head C224, these contacts being connected with contacts on the register connected in to receive a debit entry. In the same manner, contact segments C219, C218 and C218' are shown in the prior system associated with contact head C226 for controlling the circuits of the indicating mechanism for the register connected in to receive a credit entry. In the present system, however, provision is made for indicating when a register comes to rest above or below a predetermined indication, and on the debit side is provided an additional contact segment C217', and on the credit side is provided an additional contact segment C219' to be engaged, respectively, by contact heads C224 and C226. When a register with a positive indication is connected in, its arm R210 will be in engagement with contact R211a, and at the register the circuit between the common conductor C173 and the individual register conductor C106 will include all of the impedance C174 and consequently the electromagnetic mechanism C223 or C225 will be carried upwardly only a sufficient distance to carry its head C224 or C226 into engagement with contact segment C217 or C219, and electromagnetic mechanism J346l or J348l will have its circuit closed and will become effective to cause an indication showing that the indication of the register is positive.

If the indication of the connected register is negative, then arm R210 will be in engagement with contact R211c and part of impedance C174 will be removed from circuit, thus decreasing the impedance and allowing mechanism C223 or C225 to move a little farther upwardly to carry the contact head C224 or C226 into engagement with the second contact segment C216 or C218 and electromagnetic mechanism J346u or J348u becomes effective to cause indication of the fact that the register indication is on the negative side of zero. If the register, after operation, comes to rest below the low value predetermined indication, then arm R176 will be raised sufficiently only to engage with contact mechanism R253' and more of impedance R174 will be cut from circuit, thus allowing the electromagnetic mechanism to carry contact head C224 or C226 to additional contact segment C217' or C219', whereupon electromagnetic mechanism J392'd or J392'c will become effective to indicate the fact that the register indication is below the predetermined amount. If the register comes to zero after a calculation, arm R176 engages with contact mechanism R253 and cuts all the impedance from circuit, the electromagnetic mechanism being moved upwardly to carry its contact head C224 or C226 into engagement with the type contact segment C216' or C218' and electromagnetic mechanism J392d or J392c becomes effective to give the proper indication. The return signal reflecting the numerical condition of a register or registers is shown by the automatic operation of either or both contact mechanisms C223 or C225, depending upon whether the particular register is connected by the debit or credit keyboard.

For the purposes of the present invention, two classes or groups of registers are provided, one group being assigned to entries of value and the other group to entries of quantity, and also a master machine for each class of registers is provided, the operation of both master machines being identical with that of the master machine disclosed in my co-pending application. In Fig. C4 the two registers 0009' and 0009 are associated together to receive quantity and value entries respectively and reflect all signals, previously provided for, indicating certain facts relating to the numerical condition of the quantity register. The quantity register may be considered specific and the value register generic. The remaining registers are unassociated in any specialized way and may be used for either quantity or value entries. In one modification of this invention there is a prearranged and generally permanent relationship or connection between each quantity register and that register of the value group which is to take account of the value entries of the related quantity entries in the quantity register. For example, one quantity register may be assigned for the quantity account of sugar and will be permanently connected with a value which takes account of the value of the sugar involved in the various transactions. The related quantity and value registers of a set are so connected that one cannot be connected in for operation unless the other is also connected in for operation, and after they are both connected in the quantity register is operated by the quantity master machine $Mq$ and the value register is operated by the value master machine $Mv$. The permanent connection between a quantity and value register is shown in Fig. C4, the first and second registers being thus connected. The electromagnets R59 and R84 of the quantity register are connected serially in circuit with the electromagnets R59 and R84 of the value register. Therefore, one of these registers cannot be selected for operation without simultaneous selection of the other. The reflecting circuit-controlling mechanisms of these registers are also partially interconnected, as shown. All the registers are, of course, subject to connection for positive or negative operation, and all of the quantity registers need not necessarily be connected with companion value registers but may be independent.

Fig. C3 represents diagrammatically the quantity and rate keyboards and the master machine mechanism $Mq$ for controlling the operation of registers selected for receiving entries, while Fig. C5 diagrammatically shows the amount or value keyboard and the master machine $Mv$ associated therewith. The construction and operation of the master machine mechanisms is practically identical with that described in detail in the co-pending application, except that interlocking mechanism is provided which prevents the operator from setting in operation one master machine mechanism without having made a set-up or the equivalent on the key board controlling the other master machine.

The apparatus and arrangement at the value keyboard $Kv$ are exactly like those in the co-pending applications, except that a pass key $Kov$ is provided as shown in Fig. C5. This pass key carries a contact $K207v$ normally engaging contacts $K208v$ and $K209v$ and adapted, when depressed, to engage contacts $K210v$ and $K211v$. Associated with this key is also a locking electromagnet coil $K212v$ which, when energized, prevents depression of the key. The circuit connections are modified only in that the electromagnet $K125$ is connected to the battery wire C7 through conductor $C27v$ and coil $K212v$, instead of through conductor C40 as in the system of the prior application. The quantity keyboard $Kq$ construction and arrangement are exactly like that in the value keyboard, this quantity keyboard controlling the operation of the master machine $Mq$. The rate keyboard $Kr$ is not connected in the operating system circuits but is connected only in the checking and interlocking circuits and in the restoring or erasing circuits. The quantity and rate keyboards are also provided with pass keys whose parts have the same reference characters as those in the value keyboard except that in the quantity keyboard the subscript $q$ is used and in the rate keyboard the subscript $r$ is used. In the prior system the various keyboards and other apparatus were interlocked in such manner that the credit keyboard could not be actuated until set-up had been properly made on the debit keyboard, and the amount keyboard could not be actuated until set-up had been properly made upon the credit keyboard. In the present system with the additional quantity and rate keyboards, it is sometimes desirable to omit in operation one of the keyboards, and the pass keys provided enable this to be accomplished, so that, for example, the value keyboard alone can be operated after set-up on the credit keyboard.

In operation the debit and credit keyboards are actuated to set up registers in precisely the same manner as prescribed in the co-pending application, and upon actuation of the credit keyboard the quantity keyboard is unlocked by closure of the circuit including the upper coils $K33q$ of the keyboard, the lower coils being normally energized to lock the keys in their upper position through the following circuit: from battery wire C7, through conductor C99q, through the lower coils K34q, through resistance C97q, through conductor C95q, through contact K129q, through conductors C94q and C30q to battery wire C6. Current flow through the upper coils will be as follows: from battery wire C7, through conductor C31 on Fig. C2, through contacts C21, C22, through conductor C27, through normal contacts K208q, K207q, and K209q of the pass key Koq, through conductor C303q, through the upper coils K33, through contacts K71q, K69q, K70q, through conductor C94 and through conductor C30q to battery wire C6. The keys of the quantity board are now unlocked and upon proper set-up having been made the unlocking circuit for rate board Kr is closed as follows: from battery wire C7, conductor C40q, through relay C39q, through conductor C38q, through common terminal K26q of the keyboard, through the actuating key contacts K155q, K156q, through the corresponding wires in cable C33q, through the wires in cables C32q leading through the master machine Mq to conductor C34q, conductor C35q, contact brush M436q, contact wheel M433q, conductor C36q, contact wheel M431q, contact brush M432q and conductor C37q to battery wire C6. Relay C39q is actuated and connects together contacts C48q and C47q through its contact head C46q, and the unlocking or energizing circuit for the rate keyboard Kr is closed as follows: from battery wire C7, through conductor C40q, through contacts C48q, C46q, and C47q, through conductor C27q, through pass key locking coil K212q, through conductor C27q, through contacts K208r, K207r, K209r of the pass key Kor, through conductor C303r, through the upper coils K33r of the rate keyboard, through contacts K71r, K69r, K70r, through conductor C94r, and through conductor C30r to battery wire C6. Upon proper actuation of the rate keyboard a circuit will be closed through the unlocking relay C39r as follows: from battery wire C7, through conductor C40q, conductor C40r, through relay C39r, conductor C38r, common keyboard terminal K36r, through engaging contacts K155r, K156r, through conductor C41r, and through conductor C30r to the battery wire C6. Actuation of relay C39r closes the following unlocking circuit for the amount keyboard Ka: from battery wire C7, conductors C40q, C40r, through contacts C48r, C46r and C47r, through conductor C27r, through pass key locking coil K212r, through conductor C27r, through the contacts K208v, K207v K209v of the value board pass key Kov, through conductor C303r, through the upper key coils K33v, through contacts K71v, K69v, K70v, through conductor C94v, and through conductor C30v to battery wire C6. Upon actuation of the keys of the amount keyboard the unlocking relay C39v is energized through the following circuit: from battery wire C7, conductor C40v, relay C39v, conductor C38v, common terminal K26v, engaging contacts K155v, K156v, through wires in cable C33v, through wires in cables C32v, through the value master machine circuits to conductors C34v, conductor C35v, contact brush and contact wheel M436v and M433v respectively, conductor C36v, contact wheel and brush M430v, M432v, through conductor C37v to battery wire C6.

Now if the master machine mechanisms have been properly connected in by actuation of the keyboards the general operating key's unlocking circuit through unlocking magnet K125 will be closed as follows: from the battery wire C7, through conductor C40q, contacts C48q, C46q, C47q of relay C39q, through conductor C51q, through the checking contacts K161q, K162q, K166q of the quantity keyboard, through conductor C50q, through the check contacts K166v, K161v, K162v of the amount keyboard, through conductor C51v, through winding of electromagnet K125, through contacts C48v, C46v, C47v, of relay C39v, and through conductor C49v to battery wire C6. Circuit through the other unlocking electromagnet K124 will be closed after the debit and credit keyboards have been actuated, the circuit being the same as in the co-pending applications and the general operating key can then be depressed to cause operation of the master machine mechanisms to operate the connected in registers. Depression of the general operating key closes the following circuit: from battery wire C7, through conductor C40v, through the winding of electromagnet K126, contacts K119, K118 and K120 to conductor C57v, through contact brush M386v, contactor M382v, through electromagnet M141, conductor C57q, contact brush M386q, contactor M382q, electromagnet M141q and through conductor C37q to battery wire C6. The master machine shafts M8v and M8q are continuously driven by the motor M437 and the circuit just traced will be closed each time that the contactors M382 engage the contact brushes M386. Actuation of electromagnets M141v and M141q serve to clutch the master machine mechanisms Mv and Mq to the shafts M8v and M8q, respectively, and the master machine mechanisms operate in accordance with the set-ups therein to carry the set-up entry into the selected registers connected with the panel shafts driven by the master machines. After the entry has been made by the value master machine contacts M415v and M416v are closed by contact M417v, and after entry has been made by the quantity master machine Mq contacts M415q and M416q will be connected by contact M417q and circuit will be closed through the journal mechanism starting electromagnet J253 as follows: from battery wire C6, through conductor C37v, contacts M416v, M417v, M415v of master machine Mv, through conductor C63q, through contacts M416q, M417q and M415q of master machine Mq, through conductor C63, through electromagnet J253 and through conductor C64 to battery wire C7. The journal mechanism therefore cannot be set in operation until the circuit-controlling contacts on both master machines are closed, that is, the journal mechanism cannot be set in operation until the entry has been properly carried into the registers by each master machine. With each of the registers associated with the value master machine there is also associated electromagnetically operated printing mechanism, electrical circuits of which printing mechanisms are controlled by contacts M410v and M413v of the value master machine, these contacts being closed when the master machine comes to rest after an entry operation to close the following circuit: from battery wire C6, conductor C37v, contacts M413v and M410v, conductor C260v, through the printing mechanisms and back through conductor C45v to battery wire C7. In the same way the printing mechanisms for the registers associated with the quantity master machine are controlled to be operated when the quantity master machine comes to rest. As has been before described, provision is also made at the registers for controlling indicating mechanism circuits, as, for instance, the indicating mechanism for indicating when a register comes to rest at zero or the mechanism for indicating when the register comes to rest above or below a predetermined minimum indication. The printing of this information should preferably not be done until after all the entries have been properly made in both sets of registers, that is, after each master machine has entirely performed its functions.

The circuits for the information-indicating mechanisms are controlled by relay actuated electromagnetic mechanisms C296q, C297 and C296v, which will now be fully described. When the quantity master machine has completed its operations, contacts M413q will be closed and the following circuit energized: from battery wire C7, conductor C45q, conductor C44q, through electromagnet C296q, conductor C260q, contacts M413q and M410q and through conductor C37q to battery wire C6. Armature arm C300q will therefore be attracted into engagement with contact terminal C299q of electromagnet C297q. Likewise when the value master machine Mv has performed its operations, its contacts M410v and M413v will be actuated to close the following circuit: from the battery wire C7, conductor C45q, conductor C44q, magnet C296v, conductor C260v, contacts M413v and M410v, conductor C37v to battery wire C6. Armature arm C300v is attracted into engagement with contact terminal C299v, of electromagnet C297. As there is only passing contact engagement between contacts M410 and M413, and as said contacts return to their normal open position just before the master machines come to rest, the armature arms C300q and C300v might be released, but the magnetic members associated with magnets C296q and C296v are polarized or otherwise affected, so that even after current flow through these magnets is interrupted, the armature arms will be retained for a sufficient length of time to permit the electromagnetic mechanisms connected with conductor C260 to be actuated. The circuit closed by the armature arms is as follows: from battery wire C6, conductor C37q, armature arm C300q, contact C299q, winding of electromagnet C297, contact C299v, armature arm C300v, conductor C260 to one terminal of electromagnetic mechanism windings J392c and J392'c, through conductor C215' to one terminal of electromagnetic controlling mechanism windings J392d and J392'd and from the other terminals of these various windings to the contacts C219', C218' and C217', C216', through the contact heads C226 and C224, respectively, thence to the common contacts C221 and C220 to conductor C222 and conductor C202 to battery wire C7. The electromagnet C297 included in this circuit is energized and tends to draw its core C298 forwardly to strike the armature arms C300q and C300v and break their connection with the contacts C299q and C299v, thus opening the circuit just traced. A dashpot or other mechanism is provided for retarding the forward movement of the armature C298 and consequently the circuit will not be broken until electromagnetic controlling mechanisms J392c and J392'c, J392d and J392'd have been actuated to cause the proper indication. After the armature arms have been moved sufficiently by the armature C298 away from the influence of the polarized electromagnets C296q and C296v, these armature arms by gravity or spring power, will return to their normal position. The various indicating electromagnetic mechanisms are therefore actuated simultaneously and not until after each master machine mechanism has fully performed all its functions and the operation of the connected registers fully completed.

When there are no set-ups on the various keyboards the electromagnets C39 will be deenergized and the various normal contacts C83, C82 and C81 closed, and upon closure of journal mechanism contacts J193 and operation of the shift key J63 to close the circuit at this point (see Fig. C1), circuit is closed through releasing electromagnet C73 as follows: from battery wire C7, conductor C40$v$, conductor C80$v$, contacts C83, C82, C81, conductor C80$r$, contacts C83$r$, C82$r$, C81$r$, conductor C80$q$, through contacts C83$q$, C82$q$, C81$q$, through conductor C80, through contacts C79, C78, contacts C77, C76, conductor C75, contacts J193 and J192, conductor C74 electromagnet C73 and through conductor C54 to battery wire C6. Actuation of electromagnet C73 releases the special operating key C84 which may be depressed to eventually cause operation of the journal mechanism independently of the keyboard mechanisms.

I have already referred to the pass keys provided for the keyboards, which enable one or more of the keyboards to be passed or skipped. In order to disconnect one of the boards or to skip it, there must be a zero set-up, or in other words, no set-up on the board. If there is a significant set-up then, as before described, the corresponding electromagnets C39 will be energized and circuit closed through the corresponding locking coils K212 which will prevent depression of the pass key. Take, for instance, the amount keyboard. If there is any set-up on this board the electromagnet C39$v$ (Fig. C3) is energized and the following circuit closed: from battery wire C7, (Fig. C1) through locking coil K212$v$, (Fig. C5) through conductor C27$v$, through contacts C48$v$, C46$v$ and C47$v$, and through conductor C49$v$ to battery wire C6. The pass key is therefore locked and cannot be actuated and the erasing key K76$v$ must be actuated to restore the depressed keys, thereby erasing the keyboard and opening circuit through relay C39$v$ and the circuit of the locking coil K212$v$. The pass key can then be depressed and the following shunt path closed about the keyboard: from battery wire C7, in Fig. C5, through conductor C40$v$, electromagnet C39$v$, conductor C301$v$, contact K210$v$, key contact K207$v$, contact K211$v$, conductor C302$v$, and through conductor C30$v$ to battery wire C6. Therefore the locking circuit for the value keyboard will not be closed through the value keyboard contacts K155$v$, K156$v$, and the value keyboard will become unoperative when the pass key K0$v$ is depressed as its contact K207$v$ then opens the circuit connecting coils K33$v$ with the battery wire C6. Electromagnet C39$v$, however, becomes actuated to complete the unlocking circuit through the electromagnet K125. After the pass key has been depressed it is brought beyond the influence of its locking coil, and therefore although upon actuation of the relay C39 circuit is closed through the locking coil, it will have no effect on the depressed key, and this key, like the other keys of the keyboard, will be restored to its normal position upon erasure of the keyboard. In the same way, the quantity keyboard can be skipped by depressing the pass key, which causes a shunt path through the keyboard, but if a key has been depressed, the locking coil K212$q$ (Fig. C3) becomes effective to prevent depression of the pass key. The rate board K$r$ and the quantity board K$q$ may likewise be disconnected or skipped.

I shall now illustrate various adaptations of my improved system in the accounting fields. Fig. Q1 shows diagrammatically a general scheme of accounts or registers, in which the circles in the upper part of the figure, generally speaking, represent financial or commercial accounts and the circle and squares in the lower part represent merchandise or stock accounts, the squares representing quantities or amounts of the merchandise itself and the circles representing values.

C1, AR2 and AP6 are, respectively, the operative connections for cash (account No. 1) C, accounts receivable (No. 2) AR, and accounts payable (No. 6) AP. With the exception of merchandise, any other commercial account (No. 5) may be similarly represented and connected. Merchandise received (or purchaser) MR and merchandise shipped (or sold) MS, though specific commercial accounts, are also generic stock accounts and are operatively connected simultaneously with the specific stock accounts by the same initial means and by such means only, namely, in this application, by the action of the debit and credit keyboards. A101, B105, ... Y191 and Z195 are operative connections for transactions in merchandise classes A, B, ... Y and Z respectively, numbered 101, 105, ... 191 and 195 respectively.

The letters $d$, $c$ and $dc$ within the circles and squares indicate the normal nature of the showings in the several registers, as debit, credit and debit-or-credit. Arrowheads indicate the nature of the entries which may be made in the registers, a downward pointing arrow indicating a positive or debit entry and an upward pointing arrow indicating a negative or credit entry. Where no arrow is shown the register may be operated indifferently for a debit or a credit. Most of the registers shown in Fig. Q1 may be connected for operation either positively or negatively, by setting up proper numbers on the debit or the credit keyboard, respectively; but, as shown, MR, I, VA$i$, QA$i$, VB$i$ and QB$i$ may be connected only positively, and MS, O, VA$o$, QA$o$, VB$o$ and QB$o$ only negatively, these registers being designed to receive one-way entries, or those of similar nature, while all others in Fig. Q1 are designed to receive two-way entries, or those of opposing natures.

As indicated in the preamble, each commodity preferably has at least two specific registers assigned to it, one to account its quantity transactions and one to account its value transactions. Both registers of the pair are connected for operation by the same initial means and neither may be connected without the connection of the other. Likewise, each specific register connection may also be accompanied by one or more generic connections and must be so accompanied for all accounts which are generic to it, of whatever grade. These generic accounts will usually be for values, but if desired may be for quantities also. Thus, if A merchandise is received, whether by reason of a purchase or a sale returned, 101 should be set up on the debit keyboard, thereby connecting for positive operation the following registers (with others generic thereto, mentioned later): QA$i$, showing the gross quantity of A merchandise received to date, and VA$i$, its value; while if A merchandise is shipped, by reason of a sale or a purchase returned, the same number should be set up on the credit keyboard, thereby connecting for negative operation the corresponding registers QA$o$ and VA$o$, for gross shipments. In either case, QA and VA, net quantity and net value handled, respectively, are also connected for operation and in the same direction as the gross registers. Similarly, if B merchandise is received, 105 should be set up on the debit board, connecting for positive operation the following registers: QB$i$, the gross quantity of B merchandise received to date, and VB$i$, its value; while if B merchandise is shipped, 105 should be set up on the credit board, connecting for negative operation QB$o$, the gross quantity of B merchandise shipped, and VB$o$, its value; and in each case are connected QB and VB, the net quantity and net value handled, positively or negatively to agree with the B$i$'s or the B$o$'s. Whenever A or B registers are connected positively so also is I, the gross value of in-transactions; while O, the gross value of out-transactions, is negatively connected whenever A or B registers are negatively connected. AB, the net value of all transactions in A and B merchandise, is duplicatingly connected whenever VA or VB is connected, and also whenever I or O is connected,—AB being thus the genus of which VA and VB are the species on a primary basis of classification and equally the genus of which I and O are the species on a secondary basis. Y and Z registers, both Q and V, represent more simply another general class of merchandise YZ, coördinate with AB. Whenever either AB or YZ is connected positively, so also is MR, and whenever either is connected negatively so also is MS. In each case, MT, net merchandise transactions of all classes, is connected duplicatingly, and MT(V) thus shows the sum of AB and YZ and at the same time the difference between MR and MS. MR and MS may thus be considered as a synthesization of all merchandise transactions on one basis, namely, that of receipts and shipments; while AB and YZ are a synthesization of the same transactions on a diverse basis, namely, that of commodity classification.

In the preferred method which mechanically harmonizes stock - accounting with financial accounting, as diagrammed in Fig. Q1, there must be counteracting set-ups on the keyboards controlling the connection of registers for operation,—that is, a set-up on the debit board and one on the credit board, and these correlated set-ups, if effective, cannot be numerically identical.

Both set-ups may connect stock registers, as in the case of a transfer entry to correct an error, or the like; but normally one will connect cash, accounts receivable, accounts payable, or some other financial register. When a pair of stock registers are connected for operation in either direction, the quantity register will upon actuation receive the entry which is set up on the quantity keyboard, and the value register will receive the entry which is set up on the value board. Likewise, if the counteracting set-up on the debit-credit keyboards connects a financial register, such register will receive the same value entry that is received by the stock value register.

To guard against an oversight or neglect to make correlated set-ups on the quantity-value keyboards, for entry in the correlated quantity-value registers, these registers, although connected for operation by the set-ups on the debit-credit keyboards, will not be operated unless there is the equivalent of a set-up on both the quantity and the value boards. Either of these last-mentioned set-ups may be zero, thus permitting a value debit of freight charges to a given commodity without affecting the quantity registration of such commodity, and a quantity credit on account of shrinkage without affecting the cost registration.

If register operation occurs while stock numbers are set up on both debit and credit boards and there is a significant set-up on the quantity board, the quantity registers connected will receive actuations which are counterbalancing if there is a zero set-up on the quantity board, the quantity registers though connected for operation will not be actuated. In either case the value registrations will be confined to the stock registers, being counterbalanced if there is a significant value set-up and being non-existent if there is a zero set-up. If there is a stock set-up on only one of the debit-credit boards, the quantity registrations thereby permitted cannot be counterbalanced; but, independent of that fact, the value registrations, if any occur, will be counterbalanced, since no effective set-ups, financial or stock, on the debit-credit boards will fail to connect value registers counterbalancingly. Thus there is mechanically secured a necessary agreement between the entries in stock value registers and the financial entries which have to do with merchandise transactions.

A quantity register may be assigned to each value register, generic as well as specific, but showings thereby secured would commonly be of little value and they are accordingly omitted, with the exception of MT(Q), which will be reverted to. In the joint operation of financial and stock accounts contemplated in Fig. Q1 whenever the number of any merchandise class, as 101, is set up on either the debit or the credit board, though its appropriate registers, quantity and value, specific and generic, are thereby connected for operation, they cannot be actuated until a different set-up is made on the other debit-credit board, and not then until two other set-ups are made: first, a quantity set-up, and secondly, a value set-up, although either or both of these latter may be zero.

Note that while QA is the net result of transactions in A merchandise to date, it is also the net quantity of such merchandise on hand, and cannot be negative; also, that VA is not necessarily the net value of such merchandise on hand, but is simply the net value of transactions to date. Since sale values are presumably greater than purchase values, VA will, or may, eventually be negative. If QA be zero, indicating the sale of all A merchandise purchased, VA, if negative, shows the gross profit on transactions in class A, and if positive it shows the loss. If there be a balance in QA, indicating some merchandise on hand, then the purchase value of the same, combined negatively with the value in VA, will yield an indication of the gross gain or loss.

Merchandise purchases having been entered directly in A, B, Y or Z, there has as yet been no entry in inventory Inv (No. 3), under assets A, in the balance sheet C—AP; also, while QA, QB, QY and QZ directly supply an inventory as far as quantities are concerned, there is no automatic showing of corresponding values.

A full and formal inventory may be obtained in the journal and the proper showing simultaneously made in the balance sheet as follows: Connect the special registers $q$ (No. 11) creditingly and Inv debitingly, and enter successively the quantities shown in QA—B—Y—Z, together with the proper (purchase) values. Without disturbing the regular detailed merchandise accounts, this will summarize them in two sets of counterbalanced registers, the total value in Inv as a debit, offset by a dummy value account $q(v)$; and the total quantity of articles in the dummy quantity account $q(q)$ to offset the net result of quantity entries in MT(Q), instituted for this purpose. Unless these last two quantity registers have the same numerical showing there has been error in listing the quantities shown in QA—B—Y—Z. The value portions of the inventory entries may be checked at leisure and one correction entry made for the net amount of errors (if any) found therein. This permits the inventory to be obtained with a great reduction in the labor heretofore found necessary. The inventory value may be left in the balance sheet C—AP, being easily brought down to date from time to time as follows: Opposite each quantity of the formal inventory (or its latest supplement) note the quantity on hand at the (new) supplemental date, and make additive or subtractive entries in Inv (and $q$) for the difference.

The total inventory value, besides being debitingly combined with other assets, will be creditingly combined with the net result of purchases and sales MT(V) in gross gain GG, which has previously received any miscellaneous gains MG (No. 10). Net gain NG duplicates all entries in gross gain, as well as all debits to E1 (No. 7), E2 (No. 8) and E3 (No. 9), which are the specific classes of Ex, expenses, etc., chargeable against net gain. Net gain may be transferred to surplus Sp (No. 4), capital stock or its equivalent, under liabilities L, by connecting No. 4 successively and counterbalancingly with Nos. 7, 8, 9, 10, 11, 101, 105, 191, and 195, and entering in each of the latter accounts the values (and quantities) necessary to reduce them to zero. The inventory entries may then be restored creditingly in No. 11 and debitingly in the specific stock accounts as balances brought forward for the new year. Numerous variations of these closing entries will readily suggest themselves to one skilled in the art.

The simple showings of transactions in YZ merchandise and the fuller showings of transactions in AB illustrate the flexibility of the system, which is still further exhibited in Figs. Q2 and Q3, where the two-fold classification of transactions on diverse bases, A—B and I—O, is replaced by a three-fold classification, NP—NS, PS—R, and I—O, in accordance with the method set forth in the copending application. Both these figures deal with quantities only, and either may be substituted for QA in Fig. Q1.

Fig. Q1a is a diagram showing the registers in series relation more nearly approaching the electric circuit arrangement to perform the operations shown in corresponding accounts or registers in Fig. Q1, the registers in each figure being similarly designated. The detailed arrangements for operating the registers associated with 101 as shown in Figs. Q1 and Q1a are shown in the diagram of the electric circuit arrangement (Fig. CQ1), where corresponding registers are similarly designated. The detailed description in connection with Fig. CQ1 sets forth fully the operation of the registers as called for in Figs. Q1 and Q1a.

In Fig. Q2, it being desired to separate purchases from sales, 101 is assigned to the former and 103 to the latter. For a purchase of A merchandise, upon setting up 101 on the debit board, the following registers are connected for positive operation: P, gross purchases, the specific account common to all three bases; NP, net purchases, an intermediate account of the primary basis; PS, straight purchases and sales, an intermediate account of the secondary basis; I2, gross transactions $in$, an intermediate account of the tertiary basis, and QA, net transactions in A merchandise, the generic account common to all three bases.

For the return of a purchase, upon setting up 101 on the credit board, the following registers are connected for negative operation: RP, gross purchases returned (specific account, common); R, gross returns, sales as well as purchases (intermediate secondary); O2, gross transactions $out$ (intermediate tertiary), and NP and QA, as above.

For a sale, 103 is set up on the credit keyboard, connecting for negative operation: S, gross sales (specific); NS, net sales (intermediate primary), and PS, O2 and QA, as above.

For the return of a sale, 103 is set up on the debit board, connecting for positive operation: RS, gross sales returned (specific), and NS, R, I2 and QA, as above.

It will be noted that, as diagrammed in Fig. Q2, P, RS, and I2 will operate only positively and will necessarily have a debit balance; S, RP, and O2 will operate only negatively and will necessarily have a credit balance; NP and PS, while operating both positively and negatively, will normally have a debit balance and cannot have a credit balance; NS, operating both positively and negatively, will normally have a credit balance and cannot have a debit balance; R, operating both positively and negatively, may have indifferently a debit or a credit balance, according as more sales or more purchases are returned; and QA, operating both positively and negatively, represents the balance on hand, which cannot be a credit.

Thus, by entering purchases and sales in separate accounts, properly charging or crediting returns as well as original transactions (which is commonly done in the old methods), by this new method the accountant not only registers the data of four specific gross accounts (purchases, sales, purchases returned and sales returned), which are all that are done by the old entries, but he secures the totals of such accounts; and, without further volitional effort, he secures in each account six intermediate results, namely: net purchases, net sales, net straight transactions (purchases and sales), net returns (purchases and sales), total receipts and total shipments, together with a final generic net result for each account, the net balance on hand, perhaps the most valuable of all. These bookkeeping results in individual accounts should be kept distinct from somewhat similar but even more valuable results in the broader processes of accounting.

Should an entry be made in these quantity registers in error, it may be reversed and then the correct entry may be made, or a supplemental additive or subtractive entry may be made, as will be obvious to the skilled accountant. But if made with registers connected as diagrammed in Figs. Q1 or Q2, the one-way registers QA$i$, QA$o$, VA$i$, VA$o$, I and O (in Fig. Q1) and P, RP, S, RS, I2 and O2 (in Fig. Q2), not discriminating between original and correction entries, will show excessive amounts, although the net showings contained in the two-way registers will be correct.

Any discrepancies arising from correction of errors may be avoided by using the simpler set of registers shown as YZ in Fig. Q1, and it is not believed that in the more complete analysis a discrepancy in gross amounts is material so long as the net quantities and net values are correctly shown; but excessive showings arising from the proper correction of errors may be avoided, without losing the benefit of the full analysis, by the employment and arrangement of registers as shown in Fig. Q3. Here, 101 is restricted to straight purchases P and 103 to sales S, while separate numbers are assigned to purchases returned RP (102) and sales returned RS (104). This permits the substitution of two-way registers for the one-way registers above mentioned, QA$i$—O and P—O2, and enables us to make a correction entry directly in the same registers that received the erroneous entry.

If it is desired to show mechanically the gross gain on any class of merchandise when a balance remains on hand, the amount of that balance may be treated temporarily as a sale, at the purchase price, balancing it against an entry in the dummy register *q* (No. 11), Fig. Q1. This entry may be reversed later by entering the same quantity and value as a purchase.

In all cases, whether of original transactions, returns, corrections or profit-noting transfers, a printed record appears in the journal, automatically recording the numbe of the class of merchandise, the quantity and value, and the debit or credit nature of the entry. If the entry is not of a routine character which is sufficiently indicated by the automatic portions of the journal record, a typewritten explanation is provided for, in any desired detail.

It is not necessary, in order to secure the full benefit of this method in one or more classes of merchandise, that all classes should be handled separately. The principal specific classes only may be assigned separate numbers and sets of registers, and the others may be classified and handled in groups, large or small, as desired. Here, also, each member of the group may have its separate number, even though it does not have a separate register, and from the record in the journal the quantity and value of each species may be readily ascertained.

By this general method, even when the quantity or value of each class is not separately shown, the gross and net values of transactions in departments, or smaller groups, may be accurately and currently kept, with a trifling addition to the labor of making the commercial entries, and automatically in harmony with them.

Aside from its principal use in current business, a mechanically up-to-date inventory would be especially valuable in adjusting insurance in case of sudden destruction of stock.

It is within the scope of this method of handling stock accounts to print and discharge after every entry a slip or card showing the transaction, as is done by the ordinary cash registers, which slips may be turned over to the storekeeper to be checked and retained as his vouchers for all transactions affecting his stock. The copending application shows a duplicate-invoice printing-mechanism which may serve this purpose.

In Fig. CQ1 electrical circuit arrangements are diagrammatically shown for carrying out the arrangement shown in the lower half of the accounting diagram in Fig. Q1. The circles represent register mechanisms assigned to value accounts and the squares represent register mechanisms assigned to quantity accounts. The register mechanisms in Fig. CQ1 are given the same reference characters as those in Fig. Q1.

In each register mechanism the electromagnet R59 for connecting the register mechanism with the driving screw shaft is diagrammatically shown, and also the electromagnet R84 for controlling the clutch mechanism which connects the numeral wheels with the driving shafts. Some of the registers should be adapted for receiving both debit and credit entries, while others should be adapted only for receiving debit or only for receiving credit entries. Electromagnet R59 in each register mechanism, therefore, remains unpolarized or is given a polarization so that it will respond to current flow of only one direction. Arrows are shown for indicating the nature of actuation of the registers. A forwardly pointing arrow indicates that the register will respond when connected in a circuit controlled by the debit keyboard. A rearwardly pointing arrow indicates that the register is responsive when connected in a circuit controlled by the credit keyboard, and both a forwardly and rearwardly pointing arrow indicates that the register is responsive when connected in circuit with either the debit or credit keyboards.

As shown on the accounting diagram in Fig. Q1, registers AB, VA, QA, VB and QB should be responsive when connected in circuit by either the debit or credit keyboards. Registers I, VA*i*, QA*i*, VB*i*, and QB*i* should be responsive only when connected in circuit by the debt keyboard, while registers O, VA*o*, QA*o*, VB*o* and QB*o* should be responsive only when connected in circuit by the credit board. Registers YZ, VY, VZ, QY and QZ are all responsive to either debit or credit set-ups, their electromagnets R59 being unpolarized. Electromagnets R84 are always polarized and their control of the clutch mechanism is always in accordance with the direction of current flow therethrough and through the circuits connecting the registers with the debit or credit boards. In the circuit diagram conductor C*abyz* connects with one of the common wires connecting a system of registers and connects with the branch C*ab* which divides into the branches C*a* and C*b* the branch C*a* serially including the A registers, and branch C*b* serially including the B registers, the terminals of both of the branches being adapted for connection with the source of current. Applying now this circuit diagram to the accounting layout of Fig. Q1, and assuming the condition where A merchandise is received, whether by reason of a purchase or a sale returned, number 101, representing register QA, is set up on the debit keyboard to cause current flow from the conductor C*abyz* to terminals of QA. Each register having a forwardly pointing arrow is therefore responsive and is connected in for operation, these being registers QA, VA and AB, responsive to either direction of current flow, and registers QA*i*, VA*i*, and I, responsive only to current flow through the electromagnets R59 in the direction of the indicated arrow. The accounts to which the various registers are assigned have been set forth in the description of Fig. Q1. If A merchandise were shipped by reason of a sale or a purchase returned, for instance, the number 101, representative of register QA, would be set up on the credit keyboard and all the registers in the main branch C*ab* and branch C*a* responsive upon connection with the credit keyboard, will be connected in for service, that is, those registers at which there is a rearwardly pointing arrow, namely two-way registers QA, VA and AB and the one-way registers QA*o*, VA*o* and O.

After the registers have been connected in for service by a set-up on the keyboards, the value and quantity entries are set up on the proper entry boards and the selected registers actuated to receive the entries. In the same manner, if B merchandise is received, number 105, representing register QB, should be set up on the debit board and registers QB, VB, QB*i*, VB*i*, I and AB will be selected for service, while if B merchandise is shipped number 105 should be set up on the credit board and registers QB, VB, QB*o*, VB*o*, O and AB will be connected in for service. Thus, when either A or B registers are connected through the debit board register I will also be connected, and whenever A and B registers are connected with the credit board the register O will simultaneously be connected. Register YZ is connected in the main branch C*yz*, while registers VY and QY are connected in the C*y* branch and registers VZ and QZ are connected in the C*z* branch. Whenever the register QY, represented by number 191, is connected with either the debit or credit board registers QY, VZ and YZ will be connected in for service, and if register QZ, represented by number 195, is connected with either the debit or credit board registers QZ, VZ and YZ will be connected in for service. Register VY therefore receives an entry whenever QY does and VZ receives an entry whenever QZ does, while YZ receives all entries of both VY and VZ. Of course, each of the registers could be provided with circuit-controlling mechanism so that indication can be had at the operator's board or elsewhere of the relative value of the reading of any register, but this is not necessary for every register and only the more important registers may be connected up to signal back to give indication of its condition and readings at all times. In Fig. CQ1 registers QA, QB, QY and QZ are shown provided with circuit-controlling mechanism connected with the alternating current signaling circuit system AC.

Fig. CQ2 shows diagrammatically the circuit arrangement for the accounting diagram shown in Fig. Q2. As explained in the description with reference to Fig. Q2, register QA should be responsive to both debit and credit entries; I2 should respond only when connected in circuit through the debit board; O2 should respond only when connected in circuit through the credit board; registers PS and R should respond when connected in circuit either through the debit or credit boards; registers NP and NS should also be responsive to set-ups on either the debit or credit boards; registers P and RS should respond when connected up through the debit board, and RP and S should respond when connected up through the credit board. Fig. W shows diagrammatically the magnetic and electrical arrangement for registers such as QA, NP and NS. Fig. X shows the arrangement for registers such as I2 and O2. Fig. Y shows the arrangement for registers PS and R, and Fig. Z shows the arrangement for registers such as those shown in I3 or O3 in Fig. CQ3. In all these figures the electromagnet R84 is polarized and in Figs. W, X and Y it has a single winding. In Fig. W the magnet R59 is unpolarized and has a single winding. In Fig. X this electromagnet is polarized and has also a single winding. In Fig. Y this electromagnet is polarized and has two windings, one causing the register to respond when connected in circuit through the debit keyboard and the other causing the register to respond when connected in circuit through the credit keyboard. In the arrangement shown in Fig. Z electromagnet R84 is polarized and has two windings and electromagnet R59 is unpolarized and also has two windings. The circuit begins with one pole of a source of current and has a main branch C*ca'* including serially the registers QA, I2, O2 and electromagnets R84 of registers PS and R, the circuit then dividing into two branches C*a* and C*a'*, the C*a* branch including the left winding LW of electromagnet R59 of registers PS and R and the registers NP, P, and RP, and branch C*a'* includes the right windings RW of electromagnets R59 of registers PS and R and also includes the registers NS, RS and S, the terminal ends of the branches being adapted for connection with either the debit or credit keyboard. The forwardly pointing arrows at each register indicate that the register is responsive when connected in circuit through the debit board, and the rearwardly pointing arrows indicate that the register is responsive when connected in circuit through the credit board. In register PS current flow through winding LW in the direction of the adjacent arrow will cause the register to respond when connected through the debit board, and current flow through the winding RW in the direction of the adjacent arrow will cause the register to respond when connected through the credit keyboard. In register R current flow through the winding LW in the direction of the adjacent arrow causes this register to respond when connected by the credit keyboard, and current flow through the winding RW in the direction of the adjacent arrow causes the register to respond when connected through the debit keyboard. Take, now, the example worked out in Fig. Q2 and apply it to this electrical diagram CQ2. Register RP has terminal number 101 and is assigned to the purchase accounts, while register S has terminal number 103 and is assigned to the sales account.

For a purchase of A merchandise 101 is set up on the debit board, current then flowing through the main branch Caa' and branch Ca forwardly, causing therefore response of registers P, NP, PS, I2 and QA. For the return of a purchase 101 is set up on the credit board and current flow through the main branch Caa' and branch Ca will be rearwardly in circuit shown, causing therefore response of registers RP, NP, R, O2 and QA. For a sale 103 is set up on the credit keyboard and current flow through the main branch Caa' and branch Ca' will be rearwardly in the circuit shown, consequently causing response of registers S, NS, PS, O2 and QA. For the return of a sale 103 is set up on the debit board, the direction of current flow in the circuit being then forwardly in the main branch Caa' and branch Ca', consequently causing response of registers RS, NS, R, I2 and QA. In this arrangement register QA is connected with the alternating current signaling-back circuit AC.

In Fig. CQ3 are shown electrical circuits for carrying out the accountant's arrangement shown in Fig. Q3. Referring to the description with reference to Fig. Q3 and applying it to CQ3, register number 101 is assigned to purchases P, register number 103 is assigned to sales S, while register number 102 is assigned to purchases returned RP, and register number 104 is assigned to sales returned RS. This arrangement employs the use of two-way two-circuit registers having a magnetic and electrical arrangement like that shown in Fig. Z. The main branch Ca1—4 contains one register QA and divides into branches Ca1&4 and Ca2&3, branch Ca1&4 being subdivided into branches Ca1 and Ca4, branch Ca1 containing the lower winding LW of electromagnet R84 of register I3 and the left winding LW of electromagnet R59, the lower winding of electromagnet R84 of register PS and the left winding of electromagnet R59 of said register and the lower left windings in register NP and the windings of electromagnets of register P. Branch Ca4 contains the upper winding of electromagnet R84 and the right winding RW of electromagnet R59 of register I3, also includes the upper and right windings of register R, the lower and left windings of register NS and the windings of register RS. Branch Ca2&3 is divided into sub-branches Ca2 and Ca3, the branch Ca2 including the lower and left windings of register O3, the lower and left windings of register R, the upper and right windings of register NP and windings of register RP. Branch Ca3 includes upper and right windings in register O3, upper and right windings in register PS, upper and right windings in register NS, and windings in register S. The forwardly pointing arrows adjacent to the windings in the registers indicate that the register will respond when connected in circuit through the debit board, and the rearwardly pointing arrows indicate that the register will respond when connected through the credit board. Take, for instance, in the case of a purchase, number 101 is set up on the debit board forming a circuit through main branch Ca1—4, branch Ca1&4, and sub-branch Ca1 forwardly in the direction of the arrows, and consequently registers P, NP, PS, I3 and QA will respond. For purchases returned, 102 is set up on the credit board and current flows rearwardly through sub-branch Ca2 and branch Ca2&3 to main branch Ca1—4, causing a response of registers RP, NP, R, O3 and QA. For sales, 103 is set up on the credit board and registers S3, NS, PS, O3 and QA will respond, and for sales returned, 104 is set up on the debit board and registers RS, NS, R, and I3 and QA will respond. This arrangement, involving the two-way registers, enables a correction of an entry to be made directly in the same registers which received an erroneous entry. In this arrangement, also, register QA is connected in the signaling-back circuit.

Fig. R34 is an end view and Fig. R35 a side view of the working parts of a polarized electromagnet having a reciprocating armature. R254 is a frame or housing closed at one end with a removable head R255, all of non-magnetic material. R257 and R258 are the two poles of the permanent magnet or polarizing member R256. R259 is the actuating winding. It surrounds the soft iron armature R260. The reciprocating armature has a pole piece R261. The pole pieces R257 and R258 each embrace opposite sides of the armature pole piece R261 in order that a minimum unbalanced side thrust will exist. The poles R257 and R258 of the polarizing members are of opposite polarity and consequently upon passage of current in one direction through the winding R259, the polarity of the armature R260 and the pole piece R261 is such that the armature and pole piece are attracted toward the pole R257 and repelled from the pole R258. If the direction of the current flow in the winding R259 is reversed the armature will be moved in the opposite direction.

Figs. R36 and R37 are views of a polarized magnet of a slightly modified type. Its armature R260 is pivoted at R262 and swings between the pole pieces R257 and R258 of the polarizing member R256. Similar parts in the two types are designated by the same reference characters and the principle of operation is the same in both.

A "polarized" or selective one-way register may be secured in several ways. This may be accomplished by using polarized magnets for controlling the register clutch mechanism, as already described, or by an equivalent use of polarized magnets, or by modifying the mechanical members of the clutch mechanisms. One modification to produce a selective one-way register consists in the removal of the teeth from the left half of the gear R15 or the removal of the teeth from the right half of gear R18 or even this gear itself, thus preventing actuation of the numeral wheels of the register even when the clutch driving gear R11 is in alinement with one or the other of the gears R15 or R18. A mechanical modification of the members controlling the throw of the lever R81, which carries the clutch driving gear R11 so that it will be moved into alinement with only one of the gears R15 or R18 and only when the register is connected for actuation in one particular direction, would also secure the desired operation.

I claim—

1. In combination, a plurality of sets of associated registers, a set of mechanisms each adapted to control the magnitude of an entry in a register of any operatively connected set, and means for selecting any set of associated registers and for connecting each register of the set with a different one of the controlling mechanisms.

2. In combination, a plurality of pairs of associated registers, mechanism for controlling the magnitude of a given entry in a register of any connected pair, a second mechanism for controlling the magnitude of an entry in a register of any connected pair, and means for connecting one register of any selected pair with the first controlling mechanism, and for connecting the other register of the pair with the second controlling mechanism.

3. In combination, a plurality of pairs of associated registers, mechanism for controlling the magnitude of a given entry in a register of any connected pair, a second mechanism for controlling the magnitude of an entry in a register of any connected pair, means for connecting one register of any selected pair with the first controlling mechanism, and means for automatically connecting the other register of the pair with the second controlling mechanism.

4. In combination, a plurality of pairs of associated registers, mechanism for controlling the magnitude of a given entry in any connected register, a second mechanism for controlling the magnitude of an entry in any connected register, and means governed by a single volitional operation for connecting one register of any selected pair with the first controlling mechanism and for connecting the other register of the pair with the second controlling mechanism.

5. In combination, a plurality of pairs of associated registers, mechanism for controlling the magnitude of a given entry in any connected register, a second mechanism for controlling the magnitude of an entry in any connected register, means for connecting one register of any selected pair with the first controlling mechanism, and for connecting the other register of the pair with the second controlling mechanism, and interlocking mechanism to prevent the effective operation of either controlling mechanism without the other.

6. In combination, a plurality of pairs of associated registers, means for controlling the magnitude of a given entry in any connected register, a second mechanism for controlling the magnitude of an entry in any connected register, means governed by a single volitional operation for connecting one register of any selected pair with the first controlling mechanism and for connecting the other register of the pair with the second controlling mechanism, and interlocking mechanism to prevent the effective operation of either controlling mechanism without the other.

7. In combination, a plurality of quantity registers, a plurality of value registers, two independent actuating mechanisms, one for controlling the magnitude of the entry in any connected quantity register and the other for controlling the magnitude of the entry in any connected value register, and a common means for selecting any value register and its associated quantity register and connecting them with the controlling mechanisms.

8. In combination, a plurality of quantity registers, a plurality of value registers, two independent actuating mechanisms, one for controlling the magnitude of the entry in any connected quantity register and the other for controlling the magnitude of the entry in any connected value register, and a common means for selecting any value register and its associated quantity register and connecting them simultaneously with the controlling mechanisms.

9. In an accounting system, the combination of quantity and value entry receiving devices, normally disconnected mechanism for controlling the magnitude of the entries of quantity and value in said entry receiving devices, a common means for connecting any quantity entry receiving device and its associated value entry receiving device with the controlling mechanism, and means for selectively involving the connected entry receiving devices with entries of quantity and value.

10. In an accounting system having a plurality of pairs of associated quantity and value entry receiving devices, normally disconnected mechanisms for controlling the magnitude of the entries in said entry receiving devices, and means for operatively connecting the quantity entry receiving device and the associated value entry receiving device of any selected pair with their respective controlling mechanisms.

11. In combination, a plurality of pairs of associated entry receiving devices, mechanism for controlling the entry in any connected entry receiving device of one class and mechanism for controlling the entry in any connected entry receiving device of the other class, and a common volitionally controlled means for connecting any selected pair of entry receiving devices with the controlling mechanisms.

12. In a stock accounting system, the combination of a plurality of quantity registers, a plurality of value registers, the said registers being permanently associated with each other in pairs, one for each commodity, a mechanism for involving any connected quantity register with entries of quantity, a second mechanism for involving any connected value register with entries of value, and a common means for connecting any pair of registers with said entry controlling mechanisms to receive the entries of quantity and value corresponding with a given transaction.

13. In a stock accounting system, the combination of a plurality of quantity adding and subtracting devices, a plurality of value adding and subtracting devices, the said adding and subtracting devices being operatively associated with each other in pairs, each pair being permanently assigned to a particular stock, an actuating mechanism for involving any connected quantity adding and subtracting device with an entry of quantity, a second actuating mechanism for involving any connected value adding and subtracting device with an entry of value, manually operable means for setting the operation of the actuating mechanisms to correspond with the quantity and value of any transaction, and a common means for connecting any pair of adding and subtracting devices with said actuating mechanisms to receive the entries of quantity and value corresponding with a given transaction.

14. In a stock accounting system, the combination of a plurality of quantity registers, a plurality of value registers, the said registers being permanently associated with each other in pairs, one for each commodity, a mechanism for involving any connected quantity register with entries of quantity, a second mechanism for involving any connected value register with entries of value, a common means for connecting any pair of registers with said entry controlling mechanisms to receive the entries of quantity and value corresponding with a given transaction, and interlocking means for preventing the operation of either controlling mechanism except upon the actuation of the other.

15. In a stock accounting system, the combination of a plurality of quantity adding and subtracting devices, a plurality of value adding and subtracting devices, the said adding and subtracting devices being operatively associated with each other in pairs, each pair being permanently assigned to a particular stock, an actuating mechanism for involving any connected quantity adding and subtracting device with an entry of quantity, a second actuating mechanism for involving any connecting value adding and subtracting device with an entry of value, means for setting the operation of the quantity actuating mechanism to correspond with the quantity of any transaction, means for setting the operation of the value actuating mechanism to correspond with the value of the same transaction, and a common means for connecting any pair of adding and subtracting devices with said actuating mechanisms to receive the entries of quantity and value corresponding with a given transaction.

16. In a stock accounting system, the combination of a plurality of quantity adding and subtracting devices, a plurality of value adding and subtracting devices, the said adding and subtracting devices being operatively associated with each other in pairs, each pair being permanently assigned to a particular stock, an actuating mechanism for involving any connected quantity adding and subtracting device with an entry of quantity, a second actuating mechanism for involving any connected value adding and subtracting device with an entry of value, manually operable means for setting the operation of the quantity actuating mechanism to correspond with the quantity of any transaction, manually operable means for setting the operation of the value actuating mechanism to correspond with the value of the same transaction, and a common means for connecting any pair of adding and subtracting devices with said actuating mechanisms to receive the entries of quantity and value corresponding with a given transaction.

17. In a stock accounting system, the combination of a plurality of quantity adding and subtracting devices, a plurality of value adding and subtracting devices, the said adding and subtracting devices being operatively associated with each other in pairs, each pair being permanently assigned to a particular stock, an actuating mechanism for involving any connected quantity adding and subtracting device with an entry of quantity, a second actuating mechanism for involving any connected value adding and subtracting device with an entry of value, means for setting the operation of the quantity actuating mechanism to correspond with the quantity of any transaction, means for setting the operation of the value actuating mechanism to correspond with the value of the same transaction, a common means for connecting any pair of adding and subtracting devices with said actuating mechanisms to receive the entries of quantity and value corresponding with a given transaction, and interlocking mechanism for preventing the operation of either actuating mechanism except upon the actuation of the means for setting the operation of the other actuating mechanism.

18. In an accounting system, the combination of an actuating mechanism for quantitatively controlling the entry in any connected register, a manually operable keyboard for governing the actuating mechanism, a plurality of two-way registers, a plurality of one-way debit registers, a plurality of one-way credit registers, the various registers being assigned in sets to particular ledger accounts, and means governed by manually operable debit and credit keyboards for connecting any set of registers either debitingly or creditingly with the common actuating mechanism.

19. In a stock accounting system, the combination of an actuating mechanism for controlling the magnitude of the entry in any connected register, a second actuating mechanism for controlling the magnitude of the entry in any connected register, a quantity register and a value register both assigned to a particular stock account, means for operatively connecting one of the registers with one of the actuating mechanisms, and means for automatically connecting the other register with the other actuating mechanism.

20. In a stock accounting system, the combination of a quantity actuating mechanism for controlling the magnitude of the entry in any connected register, a value actuating mechanism for controlling the magnitude of the entry in any connected register, a plurality of quantity registers and a plurality of value registers, a quantity register and a value register being permanently assigned to each of several accounts, means for operatively connecting any register of one class with the actuating mechanism for that class of registers, and means for automatically connecting the other register assigned to the same account with the actuating mechanism for registers of that class.

21. In an accounting system, the combination of quantity and value entry receiving devices, normally disconnected mechanism for controlling the magnitude of the entries of quantity and value in said entry receiving devices, a common means for connecting any quantity entry receiving device and its associated value entry receiving device with the controlling mechanism, means for selectively involving the connected entry receiving devices with entries of quantity and value, a signaling device, and means governed by the position of the mechanism of the entry receiving devices for controlling the actuation of the signaling device.

22. In combination, a plurality of value adding and subtracting machines each assigned to a particular ledger account, an actuating mechanism for controlling the magnitude of the entry in any connected value adding and subtracting machine, means for reversely connecting any two of the value adding and subtracting machines with said actuating mechanism, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism.

23. In combination, a plurality of value adding and subtracting machines each assigned to a particular ledger account, an actuating mechanism for controlling the magnitude of the entry in any connected value adding and subtracting machine, means for reversely connecting any two of the value adding and subtracting machines with said actuating mechanism, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism, and an interlocking device for preventing the actuation of an adding and subtracting machine of either class except upon the operation of the actuating mechanism for controlling the entries in the other class of adding and subtracting machines.

24. In combination, a plurality of value adding and subtracting machines each assigned to a particular ledger account, an actuating mechanism for controlling the magnitude of the entry in any connected value adding and subtracting machine, means for reversely connecting any two of the value adding and subtracting machines with said actuating mechanism, the operative connection of each of the said adding and subtracting machines being automatically dependent upon the reverse connection of the other, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism.

25. In combination, a plurality of value adding and subtracting machines each assigned to a particular ledger account, an actuating mechanism for controlling the magnitude of the entry in any connected value adding and subtracting machine, means for reversely connecting any two of the value adding and subtracting machines with said actuating mechanism, the operative connection of each of the said adding and subtracting machines being automatically dependent upon the reverse connection of the other, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism, and an interlocking device for preventing the actuation of an adding and subtracting machine of either class except upon the operation of the actuating mechanism for controlling the entries in the other class of registers.

26. In combination, a plurality of value adding and subtracting machines each assigned to a particular ledger account, an actuating mechanism for controlling the magnitude of the entry in any connected value adding and subtracting machine, means for reversely connecting any two of the value adding and subtracting machines with said actuating mechanism, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism, and means for automatically governing the operative direction in which any quantity adding and subtracting machine is connected with the quantity actuating mechanism to correspond with the direction in which the associated value adding and subtracting machine is connected with the value actuating mechanism.

27. In combination, a plurality of value adding and subtracting machines each assigned to a particular ledger account, an actuating mechanism for controlling the magnitude of the entry in any connected value adding and subtracting machine, means for reversely connecting any two of the value adding and subtracting machines with said actuating mechanism, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism, an interlocking device for preventing the actuation of an adding and subtracting machine of either class except upon the operation of the actuating mechanism for controlling the entries in the other class of registers, and means for automatically governing the operative direction in which any quantity adding and subtracting machine is connected with the quantity actuating mechanism to correspond with the direction in which the associated value adding and subtracting machine is connected with the value actuating mechanism.

28. In combination, a plurality of value adding and subtracting machines each assigned to a particular ledger account, an actuating mechanism for controlling the magnitude of the entry in any connected value adding and subtracting machine, means for reversely connecting any two of the value adding and subtracting machines with said actuating mechanism, the operative connection of each of the said adding and subtracting machines being automatically dependent upon the reverse connection of the other, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism, and means for automatically governing the operative direction in which any quantity adding and subtracting machine is connected with the quantity actuating mechanism to correspond with the direction in which the associated value adding and subtracting machine is connected with the value actuating mechanism.

29. In combination, a plurality of value adding and subtracting machines each assigned to a particular ledger account, an actuating mechanism for controlling the magnitude of the entry in any connected value adding and subtracting machine, means for reversely connecting any two of the value adding and subtracting machines with said actuating mechanism, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism, a generic adding and subtracting machine, and automatic means for connecting the generic adding and subtracting machine with the appropriate actuating mechanism upon the connection of any one of a plurality of relatively specific adding and subtracting machines with an actuating mechanism.

30. In combination, a plurality of value adding and subtracting machines each assigned to a particular ledger account, actuating mechanism for controlling the magnitude of the entry in any connected value adding and subtracting machine, means for connecting any of the value adding and subtracting machines with said actuating mechanism, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, and means for automatically connecting the quantity adding and subtracting machine assigned to a particular account with the quantity actuating mechanism whenever the value adding and subtracting machine assigned to the same account is connected with the value actuating mechanism.

31. In combination, a plurality of value adding and subtracting machines each assigned to a particular ledger account, actuating mechanism for controlling the magnitude of the entry in any connected value adding and subtracting machine, means for connecting any of the value adding and subtracting machines with said actuating mechanism, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism, and interlocking mechanism serving to prevent the operation of either actuating mechanism except upon the operation of the other.

32. In combination, a plurality of value adding and subtracting machines each assigned to a particular ledger account, an actuating mechanism for controlling the magnitude of the entry in any connected value adding and subtracting machine, means for reversely connecting any two of the value adding and subtracting machines with said actuating mechanism, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism, and means governed by the position of the mechanism of the quantity adding and subtracting machines for automatically displaying a suitable signal whenever the balance in any of the quantity adding and subtracting machines passes a certain predetermined limit.

33. In combination, a plurality of value adding and subtracting machines each assigned to a particular ledger account, an actuating mechanism for controlling the magnitude of the entry in any connected value adding and subtracting machine, means for reversely connecting any two of the value adding and subtracting machines with said actuating mechanism, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism, an interlocking device for preventing the actuation of an adding and subtracting machine of either class except upon the operation of the actuating mechanism for controlling the entries in the other class of adding and subtracting machines, and means governed by the position of the mechanism of the quantity adding and subtracting machines for automatically displaying a suitable signal whenever the balance in any of the quantity adding and subtracting machines passes a certain predetermined limit.

34. In combination, a plurality of value adding and subtracting machines each assigned to a particular ledger account, an actuating mechanism for controlling the magnitude of the entry in any connected value adding and subtracting machine, means for reversely connecting any two of the value adding and subtracting machines with said actuating mechanism, the operative connection of each of the said adding and subtracting machines being automatically dependent upon the reverse connection of the other, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism, an interlocking device for preventing the actuation of an adding and subtracting machine of either class except upon the operation of the actuating mechanism for controlling the entries in the other class of adding and subtracting machines, and means governed by the position of the mechanism of the quantity adding and subtracting machines for automatically displaying a suitable signal whenever the balance in any of the quantity adding and subtracting machines passes a certain predetermined limit.

35. In combination, a plurality of value adding and subtracting machines each assigned to a particular ledger account, actuating mechanism for controlling the magnitude of the entry in any connected value adding and subtracting machine, means for connecting any of the value adding and subtracting machines with said actuating mechanism, a plurality of quantity adding and subtracting machines each assigned to a different one of the ledger accounts to which certain of the value adding and subtracting machines are assigned, a second actuating mechanism for controlling the magnitude of the entry in any connected quantity adding and subtracting machine, means for automatically connecting the quantity adding and subtracting machine assigned to a particular account with the quantity actuating mechanism whenever the value adding and subtracting machine assigned to the same account is connected with the value actuating mechanism, and means governed by the position of the mechanism of the quantity adding and subtracting machines for automatically displaying a suitable signal whenever the balance in any of the quantity adding and subtracting machines passes a certain predetermined limit.

36. In combination, a plurality of quantity registers, a plurality of value registers, two independent actuating mechanisms, one for controlling the magnitude of the entry in any connected quantity register and the other for controlling the magnitude of the entry in any connected value register, a common means for selecting any value register and its associated quantity register and connecting them with the controlling mechanisms, and means governed by the operative condition of the quantity registers for actuating suitable signaling apparatus whenever the total registration in any quantity register falls outside of a predetermined limit for such register.

37. In combination, three or more registers, mechanism for actuating any of the registers operatively connected therewith, the quantitative identity of the two actuations being automatically effected, means whereby the operator may control the magnitude of a given operation of such mechanism, means for differentially connecting any two of said registers with said actuating mechanism, and a signal associated with each register, the actuation of each signal being effected when the associated register passes through some predetermined value other than zero.

38. In combination, an adding and subtracting mechanism, signal devices located at different places, and means governed by the operative condition of the adding and subtracting mechanism for a predetermined value other than zero for controlling the actuation of said signal devices.

39. In an accounting system, the combination of one-way registers and two-way registers having fixed trains connecting them and involving them in definite accounts, an actuating mechanism for quantitatively controlling the magnitude of operation of the registers, and mechanism for connecting both kinds of registers with the common actuating mechanism.

40. In an accounting system, the combination of a two-way register and a pair of differentially operable one-way registers all connected together by fixed trains, and means for actuating said two-way register simultaneously with the one-way registers.

41. In an accounting system, the combination of a two-way register and a pair of differentially operable one-way registers all connected together by fixed trains and assigned to a particular account, actuating mechanism for quantitatively controlling the entry in a connected register, and a common means for connecting said registers with the actuating mechanism.

42. In an accounting system, the combination of a two-way register and a one-way register having a fixed relation of operation and assigned to a particular account, devices for connecting said registers together, and a common actuating mechanism for quantitatively controlling the operation of the connected registers.

43. In an accounting system, the combination of an actuating mechanism for quantitatively controlling the entry in any connected register, a two-way register and a one-way register connected together to be operated only in connection with a particular account, means for operatively connecting one of said registers with the actuating mechanism, and means for automatically connecting the other of such registers with the actuating mechanism.

44. In an accounting system, the combination of a set of registers comprising a two-way register and a pair of differentially operable one-way registers all connected together by fixed trains and all assigned to a particular account, an actuating mechanism for quantitatively controlling the entries made in the set of registers, and a common manually operable means for connecting the set of registers with the actuating mechanism.

45. In an accounting system, the combination of an actuating mechanism for quantitatively controlling the entry in any connected register, a plurality of sets of registers, each comprising a two-way register, and one or more one-way registers, each set of registers being assigned to a particular account, manually operable means for connecting any register with the actuating mechanism, and means for automatically connecting any correspondingly operable register of the same set with the actuating mechanism.

46. In an accounting system, the combination of an accounting mechanism for quantitatively controlling the actuation of any connected register, a plurality of two-way registers each assigned to a particular ledger account, one-way registers each assigned to one of the same accounts, means for connecting any two-way register either debitingly or creditingly with the actuating mechanism, and means for automatically connecting any of the one-way registers with the actuating mechanism when the associated two-way register is connected with the actuating mechanism for operation in the direction in which the one-way register is adapted to operate.

47. In combination, a group of registers, driving means for said group of registers, a second group of registers, a second independent driving means for said second group of registers, electrically controlled mechanism for selecting some of said registers for operation, means electrically controlling the operation of the first driving means and the amount of operation thereby of the selected registers connected therewith, and means for electrically controlling the operation of the second driving means and the amount of operation of the selected registers connected therewith.

48. In combination, a group of registers, a common driving means for registers of said group, a second group of registers, a second driving means for controlling the operation of the registers of said second group, a selecting keyboard, electrical contact mechanism controlled by said keyboard and connected with the registers of one group, actuation of said keyboard in a predetermined manner causing connection for service of corresponding registers of said group, electrical circuits connecting registers of the second group with registers of the first group, an amount keyboard for controlling the operation of the first driving means to cause operation of the selected registers in accordance with the set-up on said amount keyboard, a second amount keyboard for controlling the operation of the second driving means whereby the registers of the second group connected with the selected registers of the first group are operated by the second driving means in accordance with the set-up on said second amount keyboard.

49. In combination, a group of registers, a common driving means for said group, a second group of registers, a second driving means common to said second group, a common selecting means for selecting registers from said groups for connection with the corresponding driving means, and independent means for each driving mechanism for determining the amount of operation thereby of the registers connected therewith.

50. In combination, a multiplicity of registers, driving mechanism for said registers normally disconnected therefrom, electromagnetic clutch mechanism for each register for connecting such register with the driving mechanism, a selecting keyboard electrically connected with the electromagnetic clutch mechanisms and adapted for connection in circuit to cause current to flow in one direction through any selected electromagnetic clutch mechanism, a second selecting keyboard electrically connected with electromagnetic clutch mechanisms and adapted for connection in circuit to cause current flow in the opposite direction through any selected electromagnetic clutch mechanism, the electromagnetic clutch mechanisms being polarized to be responsive to current flow in one direction only.

51. In combination, a multiplicity of registers, driving mechanism associated therewith but normally disconnected therefrom, an electromagnetic clutch mechanism for each register for connecting such register with the driving mechanism, electrical connecting means for connecting together in an electrical circuit a number of said register clutch mechanisms, a keyboard for closing an electrical circuit through a number of register clutch mechanisms to cause current flow therethrough in one direction, the electromagnetic clutch mechanism of each register being polarized to be responsive to current flow therethrough in one direction only, whereby upon the closure of the circuit only such registers will be connected with the driving mechanism as are provided with clutch mechanisms polarized in such direction as to be responsive to the current flow controlled by said keyboard.

52. In combination, a multiplicity of registers, driving mechanism associated therewith but normally disconnected therefrom, an electromagnetic clutch mechanism for each register for connecting such register with the driving mechanism, electrical connecting means for connecting together in an electrical circuit a number of said register clutch mechanisms, a keyboard for closing an electrical circuit through a number of register clutch mechanisms to cause current flow therethrough in one direction, the electromagnetic clutch mechanism of each register being polarized to be responsive to current flow therethrough in one direction only, whereby upon the closure of the circuit, only such registers will be connected with the driving mechanism as are provided with clutch mechanisms polarized in such direction as to be responsive to the current flow controlled by said keyboard, and a second selecting keyboard for closing an electrical circuit through a number of register clutch mechanisms to cause current flow therethrough in the opposite direction whereby the registers provided with clutch mechanisms responsive to this current flow of opposite direction only will be connected with the driving mechanism.

53. In combination, a plurality of registers, driving means therefor, an electromagnetic mechanism for controlling the connection of each register with the driving means, each electromagnetic mechanism being polarized to be responsive only to current flow in one direction therethrough, circuits for said electromagnetic mechanisms, and means for controlling said circuits and the direction of current flow therethrough.

54. In combination, a plurality of registers, a common driving means therefor, an electromagnetic mechanism associated with each register for controlling the connection of that register with the driving means, means for permanently electrically connecting the electromagnetic mechanism of one register with the electromagnetic mechanisms of other registers whereby the connection of one register with the driving means will automatically entail the connection of the other associated registers with the driving means, and an electrical circuit for controlling the supply of current to said electromagnetic mechanisms.

55. In an accounting system, the combination of a main register, a driving means, electromagnetic connecting mechanism associated with the main register for connecting said main register with said driving means, a second driving means, a plurality of sub-registers, an electromagnetic connecting mechanism associated with each sub-register for connecting said sub-registers with the second driving means, electrical circuit connections between the electromagnetic connecting mechanisms of the sub-registers and the electromagnetic connecting mechanism of the main register whereby the flow of current through the electromagnetic connecting mechanism of the main register will entail the flow of current through the electromagnetic connecting mechanisms of the sub-registers thereby causing the automatic connection of the sub-registers with the second driving means upon the connection of the main register with the first driving means, and electrical circuits and keys for controlling the electromagnetic connecting mechanism of the main register.

56. In an accounting system, the combination of a main register, a main driving mechanism, electromagnetic connecting mechanism associated with the main register and adapted upon energization to connect the main register with the main driving mechanism, an auxiliary driving mechanism, a plurality of sub-registers, an electromagnetic connecting mechanism associated with each sub-register and adapted upon energization to connect the associated sub-register with the auxiliary driving mechanism, electrical circuits permanently connecting the electromagnetic connecting mechanisms of the sub-registers with the electromagnetic connecting mechanism of the main register, circuits and keys for controlling the energization of the electromagnetic connecting mechanism of the main register and thereby the connection of the main register with the main driving mechanism whereby the permanently connected electromagnetic connecting mechanisms of the sub-registers are energized to cause the automatic connection of the sub-registers with the auxiliary driving mechanism, means for controlling the operation of the main driving mechanism and consequently the actuation of the main register connected therewith, and independent means for controlling the operation of the auxiliary driving mechanism and consequently the actuation of the sub-register mechanisms connected therewith.

57. In a system of the class described, the combination of a group of registers, a main driving mechanism common to said registers, a group of auxiliary registers, an auxiliary driving mechanism common to the auxiliary registers, means for connecting a register of one of said groups with the driving mechanism for that group, means for automatically connecting a predetermined register of the other group with the driving mechanism for that group upon the connection of the associated register in the first said group with its driving mechanism, and independent means for controlling the operation of each driving mechanism.

58. In an accounting system, the combination of a group of registers, a common driving mechanism for the registers of said group, a second group of registers, a second driving mechanism common to the registers of the second group, means for connecting a register of one group with the driving mechanism for that group, means for automatically connecting one or more registers of the other group with the driving mechanism for that group upon the connection of the first register with its driving mechanism, and means for controlling the operation of the driving mechanisms.

59. In a system of the class described, the combination of a plurality of register mechanisms, a plurality of driving means therefor, keyboards for controlling the connection of register mechanisms with the driving means, a keyboard for each driving means for controlling the amount of operation of the register mechanisms connected with said driving means, interlocking means normally effective to require actuation of all the keyboards in a prearranged series, and means for disconnecting any of said keyboards from the series.

60. In a system of the class described, the combination of a plurality of register mechanisms, a plurality of driving means therefor, keyboards for controlling the connection of register mechanisms with the driving means, a keyboard for each driving means for controlling the amount of operation of the register mechanisms connected with said driving means, interlocking means controlled upon the completion of operation of each keyboard to unlock a certain other keyboard for operation, whereby the keyboards are confined to a certain series of operation, and means for disconnecting any of said keyboards from the series.

61. In a system of the class described, the combination of a multiplicity of reversible register mechanisms, driving means for said register mechanisms, means for controlling the connection of one of said register mechanisms with the driving means, electrical means for automatically connecting said one register mechanism with other register mechanisms and for automatically entailing operation of the other register mechanisms upon operation of the one register mechanism by the driving means, and means for determining the direction of operation of the register mechanisms.

62. The combination with a register, of a signal coöperating with said register, said signal arranged to assume any one of a plurality of positions, means carried by said register arranged to cause said signal to assume one of said positions for automatically indicating when the reading of the register falls below a predetermined amount, and devices movable relatively to the register mechanism for giving said amount any desired value.

63. The combination with a register, of signaling mechanism coöperating with said register, said mechanism arranged to assume any one of a plurality of positions, means carried by said register arranged to cause said mechanism to assume one of said positions for automatically indicating when a predetermined indication other than zero is reached or passed, and devices movable relatively to the register mechanism for giving said amount any desired value.

64. The combination of a register, a signal having coöperating means located at a distance therefrom, said signal arranged to assume any one of a plurality of positions, and means carried by said register arranged to cause said signal to assume one of said positions for automatically indicating when the reading of the register falls below a predetermined amount.

65. In combination, two register-actuating mechanisms, interlocking means for preventing the setting in operation of one mechanism unless the other mechanism has also been set in operation, and means for controlling the operation of each mechanism independently of the other.

66. In combination, two master machines, interlocking means for preventing the setting in operation of one master machine unless the other master machine has also been set in operation, and a keyboard for controlling the operation of each master machine independently of the other.

67. In combination, a pair of associated registers, means for actuating each register independently of the other a predetermined amount, and automatic means whereby neither register may be connected for actuation without the connection of the other register.

68. In combination, a pair of associated registers, means for actuating each register independently of the other a predetermined amount, and electrically controlled means whereby neither register may be connected for actuation without the connection of the other.

69. In combination, a pair of associated registers, means for actuating the same predetermined amounts, and means whereby the connection of one register for actuation automatically connects the other register.

70. In combination, a plurality of registers, a plurality of actuating mechanisms therefor, and means for compelling simultaneous connection of said registers with the actuating mechanism for operation in the same direction.

71. In combination, a plurality of registers, actuating mechanisms therefor, means for compelling simultaneous connection of said registers with the actuating mechanism, and manually operable means for independently controlling the amount of actuation of each register.

72. In combination, two register-actuating mechanisms, a key-board for controlling the operation of each mechanism to enter into the connected register an amount determined by the set-up on the associated keyboard, and interlocking means which prevents the setting in operation of one mechanism unless a set-up (or the equivalent thereof) has been made on the keyboard associated with the other mechanism.

73. In combination, a quantity register, a value register, actuating mechanism for each register to actuate the same any desired amount, and means whereby the selection of one register for actuation automatically selects the other register.

74. In combination, a quantity register, a value register, actuating mechanism for each register to actuate the same any desired amount, means whereby the selection of one register for actuation automatically selects the other register, and a keyboard for controlling the operation of each mechanism.

75. In a system of the class described, a plurality of keyboards, means for compelling operation of said keyboards in a predetermined sequence, pass keys associatel with one or more of said keyboards to permit the omission of those keyboards in the sequence of operation, and register-actuating mechanism controlled by said keyboards.

76. In combination, a pair of permanently associated registers, means for controlling the operation of each register independently of the other, and connections between said registers for compelling simultaneous selection of the registers for operation.

77. In combination, a register, actuating mechanism therefor, said register being normally disconnected from said mechanism, and selecting means associated with the register for connecting the same with the actuating mechanism, said selecting means being operable only when the register is selected for actuation in a certain direction.

78. In combination, actuating mechanism, a register normally disconnected therefrom, and means for permitting an operative connection between the register and the actuating mechanism only when the register is to be actuated in a predetermined direction.

79. In combination, a plurality of registers, actuating mechanism for said registers normally disconnected therefrom, and an electromagnetic selecting device associated with each register for establishing operative connection between that register and the actuating mechanism, said selecting devices being operable only when the respective registers are selected for actuation in a predetermined direction.

80. The combination with an energizing circuit, of a plurality of electromagnetic register-selecting devices included in said circuit and adapted to be effectively actuated only when the associated registers are selected for operation in a predetermined direction.

81. In combination, a plurality of registers provided each with an electromagnetic selecting device, an energizing circuit for said selecting devices, a pair of keyboards for controlling said circuit, certain of said selecting devices being operable only when one of said keyboards is actuated, while other of said selecting devices are operable only when the other keyboard is actuated, and means for actuating the selected registers in a direction determined by the keyboard which was actuated to select the registers.

82. In combination, a set of associated individual registers, mechanism for actuating the same, and means whereby the selection of one register for actuation automatically selects other registers of said set.

83. In combination, actuating mechanism, a register adapted to be connected with said mechanism only when the register is selected for operation in a certain direction, a second register adapted to be connected only when the same is selected for actuation in a reverse direction, and a third register adapted to be connected for actuation in either direction simultaneously with one or the other of said two first-mentioned registers.

84. In combination, a register, an actuating mechanism, and means for operatively connecting the register with said actuating mechanism only when selected for operation in a certain direction.

85. In combination, a register operable accumulatingly in one direction, a second register operable accumulatingly in a reverse direction, and a third register normally connected with said registers and operable simultaneously with either of said registers for automatically indicating the difference between the amounts of actuation of the first and second registers.

86. In combination, a pair of registers, means for actuating the same each in a single direction, and a third register actuated through such means for automatically indicating the difference between the amounts of actuation of said pair of registers.

87. In combination, a pair of registers, means for actuating the same each in a single direction, manually operated keyboard mechanism for controlling the operation of said actuating means, and a third register for automatically indicating the difference between the amounts of actuation of said pair of registers.

88. The combination with a pair of entry receiving devices, of a third entry receiving device, and mechanism for automatically operating said third device conjointly with either of said other devices for indicating upon said third device the difference between the entries of said pair of devices.

89. In combination, a pair of registers, mechanism for actuating the same each in a single direction, means for connecting either of said registers for actuation, a third register, and means whereby said third register is automatically connected for actuation upon connection of either one of said pair of registers to cause said third register to indicate the difference between the indications of said pair of registers.

90. In combination, a pair of one-way registers, a third register, means for actuating said registers, and means for automatically compelling simultaneous actuation of said third register with either one of said pair of registers, whereby said third register indicates the difference between the amounts of actuation of said pair of registers.

91. In combination, a pair of one-way registers, a third register, means for actuating said registers, keyboard mechanism for controlling said actuating means, and means for automatically compelling simultaneous actuation of said third register with either one of said pair of registers, whereby said third register indicates the difference between the amounts of actuation of said pair of registers.

92. In combination, a plurality of entry-receiving devices of one class, each assigned to a particular ledger account, an actuating mechanism for controlling the entry in any connected device, means for counterbalancingly connecting any two of said devices with said actuating mechanism, a plurality of entry-receiving devices of a second class, each assigned to a different one of the ledger accounts to which certain of the first-mentioned entry-receiving devices are assigned, a second actuating mechanism for controlling the entry in any connected device of the second class, and means for automatically connecting the register of the first class assigned to a particular account with the associated actuating mechanism whenever the register of the second class assigned to the same account is connected with the second actuating mechanism.

93. In combination, a plurality of quantity registers, a corresponding plurality of value registers, each quantity register being permanently associated with a value register, actuating mechanism for involving a connected pair of said registers with entries of quantity and value, and means for controlling the operation of said mechanism.

94. In combination, a register, a signal having coöperating means located at a distance from said register, said signal arranged to assume any one of a plurality of positions, means carried by said register arranged to cause said signal to assume one of said positions, and electrical connections controlled by said signal for causing operation of its coöperating means when the balance represented in the register passes a predetermined limit.

95. In combination, suitable actuating mechanism, a set of registers adapted to be operatively connected with said mechanism only when selected for actuation in a certain direction, a second set of registers adapted to be operatively connected with said mechanism only when selected for actuation in the reverse direction, and a third set of registers adapted to be operatively connected with said mechanism when selected for operation in either direction.

96. In combination, suitable actuating mechanism, a set of registers adapted to be operatively connected with said mechanism only when selected for actuation in a certain direction, a second set of registers adapted to be operatively connected with said mechanism only when selected for actuation in the reverse direction, a third set of registers adapted to be operatively connected with said mechanism when selected for operation in either direction, and means whereby the selection of a register of the first or second set automatically causes the selection of a register of the third set.

97. In combination, a set of permanently associated registers, means for independently controlling the operation of each register, and means whereby the selection of one register automatically selects the other registers for actuation.

98. In combination, a register adapted to receive entries of one class in a single direction, a second register adapted to receive entries of another class in a single direction, and a third register simultaneously operable with either of said first-mentioned registers to indicate the excess of the entries in one of said registers over the entries in the other register.

99. The combination of a register, a signal, said signal arranged to assume any one of a plurality of positions, means carried by said register arranged to cause said signal to assume one of said positions when the register reaches or passes through any one of a plurality of positions.

100. The combination of a quantity register, a value register associated therewith, said registers being assigned to a given account, actuating mechanism for each register, a keyboard for selecting both registers for operation by a single set-up, and means for independently controlling the operation fo each mechanism.

101. The combination of a quantity register, a value register associated therewith, said registers being assigned to a given account, actuating mechanism for each register, a keyboard for selecting both registers for operation by a single set-up, and a keyboard for controlling the operation of each mechanism.

102. The combination of a set of three quantity registers, a set of three value registers, the two sets of registers being assigned to a given account, each set of registers consisting of a two-way register and two one-way registers, actuating mechanism for each set of registers, a keyboard, connections whereby a single set-up on said keyboard automatically selects for operation the two-way register and one of the one-way registers of each set, and means for independently controlling the operation of each mechanism to involve the selected registers with a predetermined entry.

103. The combination of a set of three quantity registers, a set of three value registers, the two sets of registers being assigned to a given account, each set of registers consisting of a two-way register and two one-way registers, actuating mechanism for each set of registers, a keyboard, connections whereby a single set-up on said keyboard automatically selects for operation the two-way register and one of the one-way registers of each set, a quantity keyboard for controlling the operation of the quantity mechanism, and a value keyboard for controlling the operation of the value mechanism.

104. In an accounting system, the combination with a quantity register and a value register assigned to a given account, of common connecting mechanism for connecting the quantity register with suitable actuating means and simultaneously connecting the value register with independent actuating means by a single operation of said connecting mechanism.

105. In an accounting system, the combination of a plurality of quantity registers, and a plurality of value registers, each quantity register being operatively associated with a companion value register, a pair of such registers being assigned to a given account.

106. In combination, a plurality of entry-receiving devices of one class, each assigned to a particular ledger account, an actuating mechanism for controlling the entry in any connected device, means for counterbalancingly connecting any two of said devices with said actuating mechanism, a plurality of entry-receiving devices of a second class, each assigned to a different one of the ledger accounts to which certain of the first-mentioned entry-receiving devices are assigned, a second actuating mechanism for controlling the entry in any connected device of the second class, means for automatically connecting the register of the first class assigned to a particular account with the associated actuating mechanism whenever the register of the second class assigned to the same account is connected with the second actuating mechanism, and record-making apparatus for automatically making a common record of the entries with which the registers are involved.

107. The combination of a plurality of value adding-and-subtracting machines each assigned to a particular ledger account, an actuating mechanism for controlling the magnitude of the entry in any connected value machine, means for counterbalancingly connecting any of the two value machines with said actuating mechanism, the operative connection of each of the said value machines being automatically dependent upon the counterbalancing connection of the other, a plurality of quantity adding-and-subtracting machines each assigned to a different one of the ledger accounts to which certain of the value machines are assigned, a second actuating mechanism for controlling the magnitude of the entry in any connected quantity machine, means for automatically connecting the quantity machine assigned to a particular account with the quantity mechanism whenever the value machine assigned to the same account is connected with the value actuating mechanism, and record-making apparatus for automatically making a common record of the entries with which the adding-and-subtracting machines are involved.

108. The combination of a quantity register, a value register associated therewith, said registers being assigned to a given account, actuating mechanism for each register, a keyboard for selecting both registers for operation by a single set-up, means for independently controlling the operation of each mechanism, and record-making apparatus for automatically making a record of the entries with which the registers are involved.

In witness whereof, I hereunto subscribe my name, this seventh day of February, A. D. 1908.

WILLIAM J. CRUMPTON.

Witnesses:
CHARLES H. TALLMADGE,
LEONARD W. NOVANDER.